US007533184B2

(12) United States Patent
Miller et al.

(10) Patent No.: US 7,533,184 B2
(45) Date of Patent: May 12, 2009

(54) PEER-TO-PEER NAME RESOLUTION WIRE PROTOCOL AND MESSAGE FORMAT DATA STRUCTURE FOR USE THEREIN

(75) Inventors: John L. Miller, Woodinville, WA (US); Henry Rawas, Bellevue, WA (US); Radu Simionescu, Redmond, WA (US); Brian Lieuallen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1101 days.

(21) Appl. No.: 10/461,940

(22) Filed: Jun. 13, 2003

(65) Prior Publication Data

US 2005/0004916 A1 Jan. 6, 2005

(51) Int. Cl.
*G06F 15/16* (2006.01)
(52) U.S. Cl. .................... 709/236; 709/230
(58) Field of Classification Search .................. 709/245
See application file for complete search history.

(56) References Cited

U.S. PATENT DOCUMENTS

| | | | |
|---|---|---|---|
| 5,586,264 A | 12/1996 | Belknap et al. | |
| 5,987,376 A * | 11/1999 | Olson et al. | 701/201 |
| 6,205,481 B1 * | 3/2001 | Heddaya et al. | 709/226 |
| 6,269,099 B1 * | 7/2001 | Borella et al. | 370/389 |
| 6,636,854 B2 * | 10/2003 | Dutta et al. | 707/10 |
| 6,674,459 B2 | 1/2004 | Ben-Shachar et al. | |
| 6,748,420 B1 * | 6/2004 | Quatrano et al. | 709/205 |
| 6,898,200 B1 * | 5/2005 | Luciani | 370/352 |
| 7,051,102 B2 * | 5/2006 | Gupta et al. | 709/226 |
| 7,065,587 B2 * | 6/2006 | Huitema et al. | 709/245 |
| 7,185,194 B2 * | 2/2007 | Morikawa et al. | 713/156 |
| 7,251,694 B2 * | 7/2007 | Gupta et al. | 709/226 |
| 7,418,479 B2 * | 8/2008 | Gupta et al. | 709/216 |
| 2002/0075900 A1 * | 6/2002 | Turina et al. | 370/467 |
| 2002/0143989 A1 | 10/2002 | Huitema et al. | |
| 2002/0156875 A1 * | 10/2002 | Pabla | 709/220 |
| 2003/0041141 A1 * | 2/2003 | Abdelaziz et al. | 709/223 |
| 2003/0055892 A1 | 3/2003 | Huitema et al. | |
| 2003/0056093 A1 * | 3/2003 | Huitema et al. | 713/156 |
| 2003/0056094 A1 * | 3/2003 | Huitema et al. | 713/157 |
| 2003/0158839 A1 * | 8/2003 | Faybishenko et al. | 707/3 |
| 2003/0196060 A1 | 10/2003 | Miller | |
| 2003/0204626 A1 * | 10/2003 | Wheeler | 709/245 |
| 2003/0204742 A1 * | 10/2003 | Gupta et al. | 713/200 |
| 2003/0217140 A1 * | 11/2003 | Burbeck et al. | 709/224 |

(Continued)

OTHER PUBLICATIONS

K. Sklower et al., RFC 1990 The PPP multilink Protocol (MP), Aug. 1996, 1-23.*

(Continued)

*Primary Examiner*—David E England

(57) ABSTRACT

An extensible data structure for messages in a peer to peer name resolution protocol is presented. This message data structure utilizes a number of fields, each containing a message element. Preferably, the first field is the message header that includes protocol information and identifies the type of message. Each message element contains a number of fields. These message element fields include a type field, a length field, and the content or payload of the message element. In one embodiment, at least ten messages are formed for proper operation of a Peer To Peer Name Resolution Protocol (PNRP), including RESOLVE, RESPONSE, SOLICIT, ADVERTISE, REQUEST, FLOOD, INQUIRE, AUTHORITY, ACK, and REPAIR messages.

94 Claims, 4 Drawing Sheets

U.S. PATENT DOCUMENTS

| | | | |
|---|---|---|---|
| 2004/0181487 | A1 | 9/2004 | Hanson |
| 2004/0213220 | A1* | 10/2004 | Davis .......................... 370/389 |
| 2004/0236863 | A1 | 11/2004 | Shen et al. |
| 2005/0216556 | A1 | 9/2005 | Manion et al. |
| 2006/0077911 | A1* | 4/2006 | Shaffer et al. ............... 370/260 |
| 2006/0251085 | A1* | 11/2006 | Kalkunte et al. ............ 370/400 |

OTHER PUBLICATIONS

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay*, at Department of Computer Science at Stanford University, 13 pages.

Rowstron, Antony, and Peter Druschel, *Pastry: Scalable, distributed object location and routing for large-scale peer-to-peer systems*, at Microsoft Research, Ltd., St. George House and Rice University, 20 pages.

Druschel, Peter, and Antony Rowstron, *PAST: A large-scale, persistent peer-to-peer storage utility*, at Rice University and Microsoft Research, 6 pages.

Rowstron, Antony, and Peter Druschel, *Storage management and caching in PAST, a large-scale, persistent peer-to-peer storage utility*, at Microsoft Research, Ltd., St. George House and Rice University, 14 pages.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.lcs.mit.edu/chord.

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

Bit Torrent; "What is BitTorrent?" Copyright 2001-2005 BitTorrent, Inc.

Microsoft Corporation; "Introduction to Windows Peer-to-Peer Networking," Published: Jan. 2003.

Groove Networks, Customers: Case Studies; www.nps.navy.mil <http://www.nps.navy.mil>.

* cited by examiner

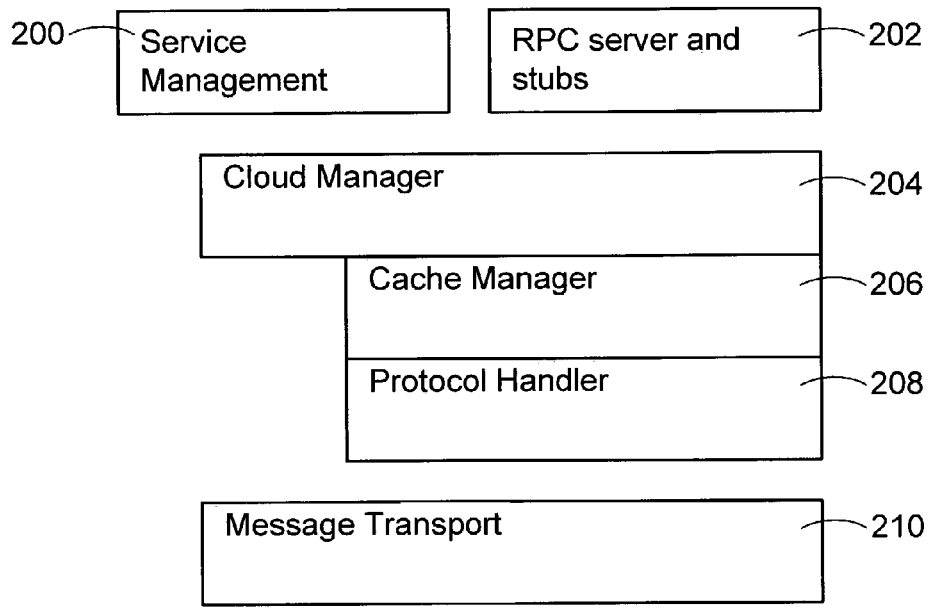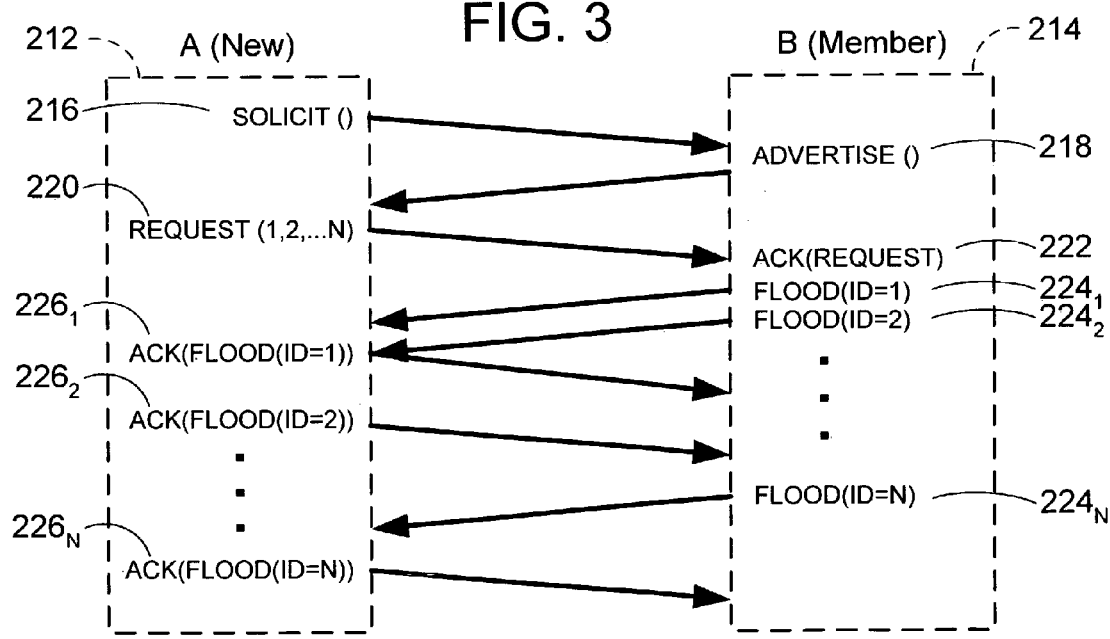

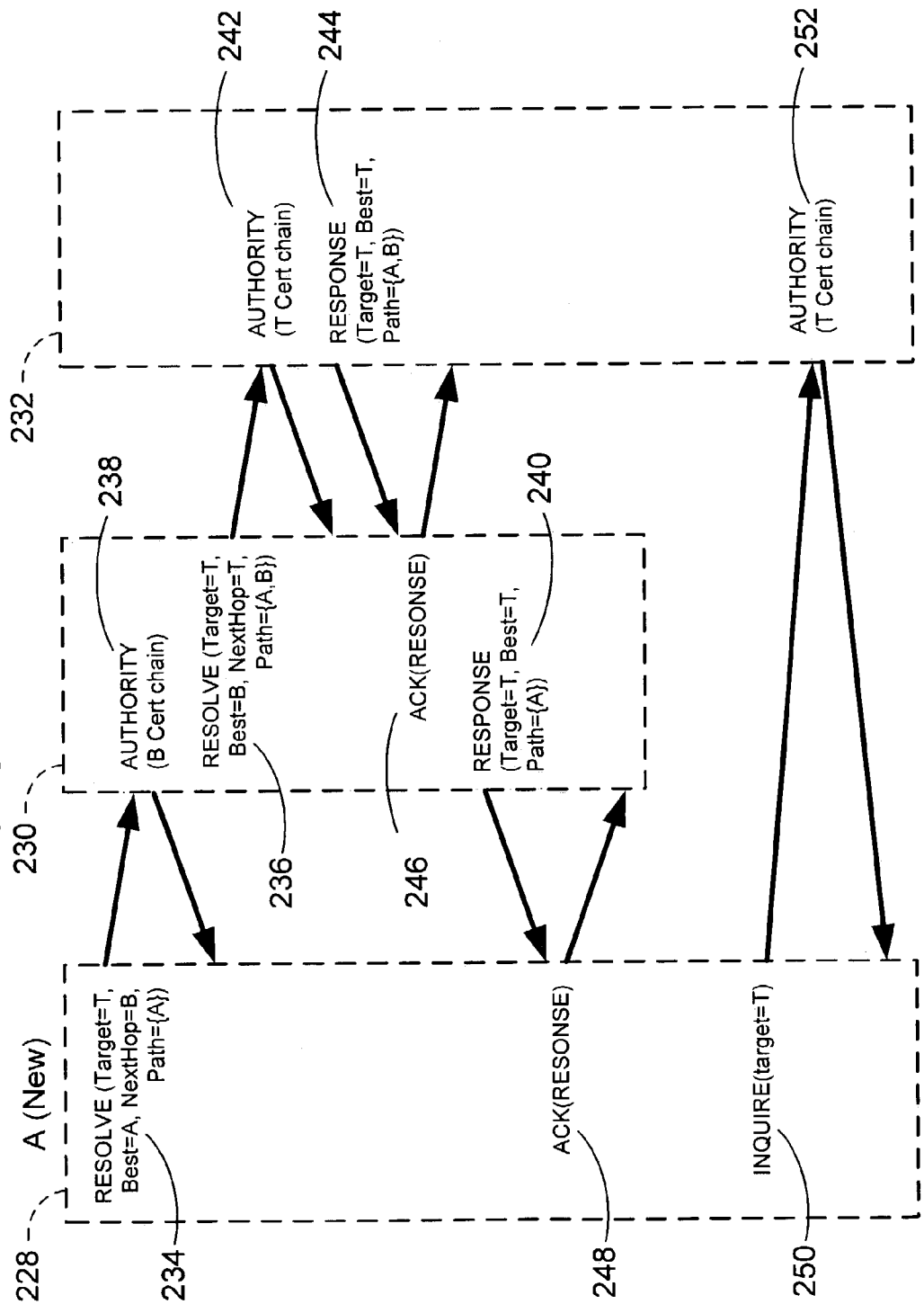

PEER-TO-PEER NAME RESOLUTION WIRE PROTOCOL AND MESSAGE FORMAT DATA STRUCTURE FOR USE THEREIN

FIELD OF THE INVENTION

The present invention relates generally to communication protocols in a peer-to-peer infrastructure, and more particularly to message format data structures to allow structured communication in a peer-to-peer graph.

BACKGROUND OF THE INVENTION

Various communication technologies on the Internet allow users with common interest to collaborate, share files, chat with one another, multi-cast audio and video for presentations and group meetings, and engage in multi-player gaming. Currently, however, most communication on the Internet takes place in a server centric environment whereby all communication flows to or through large central servers to which individuals may connect to join and participate in such communication.

With the reemergence of peer-to-peer technology, the current server centric model of Internet communication is quickly being replaced. Indeed, peer-to-peer technologies enable users to contact one another in a serverlessz environment, free from the constraints of server based Internet communication. In a peer-to-peer based system, a users anonymity and privacy may be maintained since communication occurs directly between peers within the network. However, while individual communication and file sharing is relatively well established in peer-to-peer networks, establishing, discovering, joining, maintaining, and sharing information in a peer-to-peer environment is not well established.

Peer-to-peer communication, and in fact all types of communication, depend on the possibility of establishing valid connections between selected entities or nodes. These entities or nodes may be peers (e.g., users or machines) or groups formed within a peer-to-peer network. The connections between the nodes form the peer-to-peer graph that enables communication and information to be passed to and between the nodes. However, entities may have one or several addresses that may vary because the entities move in the network, because the topology changes, because an address lease cannot be renewed, because the group function or purpose has changed, etc. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols allow entities to publish their individual or group address(es) through various mechanisms. Some protocols also allow a client to acquire knowledge of other entities' addresses through the processing of requests from others in the network. Indeed, it is this acquisition of address knowledge that enables successful operation of these peer-to-peer networks by maintaining a robust graph. That is, the better the information about other peers and groups in the network (i.e. the more robust the graph), the greater the likelihood that a search for a particular resource or record will converge.

As with a server centric environment, the peer-to-peer graphs may be entirely open to allow Internet file searching and sharing within the graph. However, because peer-to-peer networks are formed as a graph of distributed users or peers, it is necessary that communication and data (records) be passed from one peer to another before all peers within a network may become cognizant of the shared information. Systems that provide such routing include Usenet and OSPF. However, such current systems suffer from limitations that have, to date, limited the full development of peer-to-peer technology. Additionally, peer-to-peer networks currently suffer from a lack of adequate graph management that, at times allows the graphs to "break" or become split when one of the members leaves the group. In such an instance, information from one part of the graph may no longer be passed to peer members on the other side of the partition created by the departure of one of the peers. As a further disadvantage, no adequate mechanism exists for the detection of such partition.

In addition to the function problems existing in the art, the amount of network traffic can easily overwhelm the peers participating within the cloud. Message size and structure complicates a peers ability to rapidly process messages, and results in delayed or dropped communications as the size of the cloud grows.

There exists, therefore, a need in the art for a peer-to-peer messaging protocol and data structure that addresses the above-described and other problems existing in the art.

BRIEF SUMMARY OF THE INVENTION

The inventive concepts disclosed in this application involve an extensible data structure for messages suitable for use in a peer to peer name resolution protocol. This message data structure utilizes message data fields to construct various messages of use to the PNRP. Each of the message data fields contain a message element. Preferably, the first field is the message header element that includes protocol information and identifies the type of message.

As with the messages themselves, each message element contains a number of message element data fields. These message element fields include a type field, a length field, and the content or payload of the message element. The type field includes an identifier that designates the type of message element. The length field identifies the length of the message element, including the field type and the length fields.

In one embodiment, at least ten messages are formed for proper operation of a Peer To Peer Name Resolution Protocol (PNRP). These ten messages including a RESOLVE message, a RESPONSE message, a SOLICIT message, an ADVERTISE message, a REQUEST message, a FLOOD message, an INQUIRE message, an AUTHORITY message, an ACK message, and a REPAIR message. These messages are constructed from twenty-two different message elements existing in a preferred embodiment.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2 is a simplified block diagram illustrating the functional elements of the Peer to Peer Name Resolution Protocol (PNRP);

FIG. 3 is a protocol message flow diagram illustrating an aspect of the present invention;

FIG. 4 is a protocol message flow diagram illustrating another aspect of the present invention;

Figure 1:
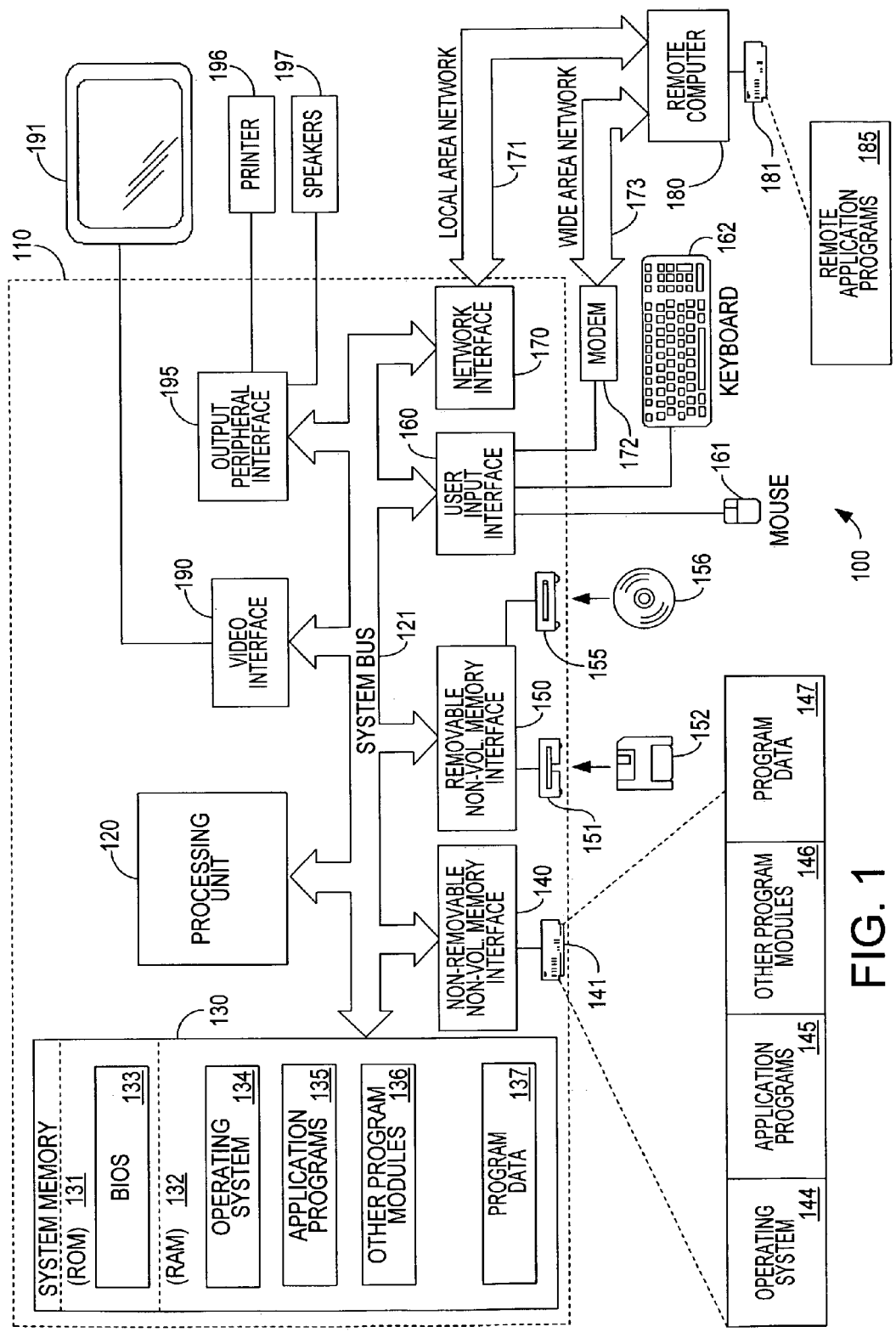
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peer-to-peer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the identity management system and method of the instant invention finds particular applicability is described in co-pending application Ser. No. 09/942,164, entitled Peer-To-Peer Name Resolution Protocol (PNRP) And Multilevel Cache For Use Therewith, filed on Aug. 29, 2001, in co-pending application Ser. No. 10/122,863, entitled Multi-Level Cache Architecture and Cache Management Method for Peer-To-Peer Name Resolution Protocol, filed Apr. 15, 2002, and in co-pending application Ser. No. 09/955,923, entitled Peer-To-Peer Group Management and Method For Maintaining Peer-To-Peer Graphs, filed on Sep. 19, 2001, the teachings and disclosure of which are hereby incorporated in their entireties by reference thereto.

Likewise, co-pending application Ser. No. 09/956,260, entitled Peer-To-Peer Name Resolution Protocol (PNRP) Security Infrastructure And Method, filed on Sep. 19, 2001 describes an underlying security infrastructure that ensures that the identities of the various entities within the network are valid, without unnecessary burdening the network with excess traffic. In the P2P grouping environment, co-pending application Ser. No. 09/955,924, entitled Peer-To-Peer Name Resolution Protocol (PNRP) Group Security Infrastructure and Method, filed on Sep. 19, 2001, describes the underlying security infrastructure used for such groups. The teachings and disclosure of these applications are also incorporated in their entireties by reference thereto. However, while the interfaces and methods of the present invention find particular applicability to and interaction with such PNRP, one skilled in the art will recognize that the present invention is not limited thereby, but has applicability to any P2P system or protocol that desires to provide P2P graph management functions.

As discussed in the above-incorporated co-pending application describing the PNRP and to provide some useful background, the peer name resolution protocol (PNRP) is a peer-based name-to-address resolution protocol. Peer resources can be given a Peer Name. An application can register a Peer Name with PNRP to make it discoverable to other peers. Other applications can use PNRP to resolve a Peer Name to get the corresponding IP address and port of the registering application. PNRP does not provide any mechanism to find or browse for Peer Names. The mechanism of distributing Peer Names must be done via other means. Resolution of Peer Names to addresses is done by having the participating peers co-operate in forwarding messages to one another, and maintaining a distributed cache of the Peer Name to address mappings. The registration and resolution mechanism does not rely on the existence of servers, except for initialization. When a PNRP instance first comes up, it needs to find the address of some other PNRP instances with which to exchange data. If no other means are available, then well known servers are used to obtain a list of other PNRP instances.

In other words, PNRP allows peer applications to register a Peer Name to endpoint mapping, and to resolve a Peer Name to obtain the endpoint. At this point some definitions would be appropriate. A Peer Name is a string that identifies a peer resource. To be able to register a Peer Name, an application must have access to a public/private key pair. The key pair is used to sign some of the messages to avoid tampering. A Peer Name may also be derived from the public key, to enable verification of identity ownership. An endpoint is one IPv6/IPv4 address, port, and protocol. In actual fact a list of endpoints may be registered with a single Peer Name, and the list is returned when the Peer Name is resolved. A node is an instance of the PNRP protocol service. There is normally one node per computer. A cloud is a network of nodes that can reach each other. A single node may be connected to more than one cloud. A cloud has a scope property that is equivalent to the scopes defined in IPv6—Global, Site Local, and Link Local. A node may have multiple Site Local clouds and multiple Link Local clouds. Communication between nodes should never cross from one cloud to another. Cloud names are used to distinguish clouds. A Peer Name may be registered on more than one node. PNRP keeps each registration distinct. The endpoint list associated with each Peer Name instance will be different. Within a node, it is also possible to register a Peer Name on more than one cloud to which the node is connected. Each of these registrations is distinct. Normally, the endpoint list will be different in each of these instances as well. When a node tries to resolve a Peer Name, it does this on a selected cloud. The resolve will succeed only if the Peer Name is registered in the same cloud. It is possible to resolve a Peer Name on more than one cloud simultaneously, but these are treated as independent resolve requests.

The PNRP service is comprised of several modules that work together, as illustrated in FIG. 2. The Service Management component 200 deals with simple housekeeping such as starting and stopping the PNRP service. The RPC server and stubs 202 provides the interface between client processes and the PNRP service. This manages the exposed interface, providing entry points for requests, and notifications of events and request completion. It also deals with recovering from client process termination. The Cloud Manager 204 maintains state of specific client requests and it maintains the list of available PNRP clouds. It is responsible for creating clouds and informing clients of changes to cloud states.

The Cache Manager 206 maintains the local PNRP cache, and the list of locally registered PNRP names for each cloud. It is part of the distributed PNRP cache. It provides lookup and next hop selection for resolve requests coming from other computers. It performs maintenance on its own cache by periodically initiating resolve requests to ensure a well structured cache. It performs detection of cloud splits, and tries to repair them. It provides the ability to have multiple registered Peer IDs, and structures the cache to support each one. The Protocol Manager 208 deals with creating and sending valid PNRP messages, and processing received PNRP messages. It works together with the Cache Manager 206 to implement the PNRP protocol. Finally, the Message Transport 210 deals with the actual sending and receiving of messages. It handles multiple network interfaces and addresses, and detects changes in the set of local addresses. If multiple protocols are required (IPv4 and IPv6) then this component will deal with both protocols.

Each PNRP node maintains a cache of Peer Name to endpoint mappings for some other nodes in a cloud. Messages constructed in accordance with the present invention are exchanged between nodes to distribute information about Peer Names to nodes in the cloud. It is the responsibility of each node to maintain its cache properly. As described by the above identified applications, the PNRP protocol defines a numerical namespace. Each Peer Name is converted to a number, and the numbers can be compared to determine proximity in the namespace. When a request to resolve a Peer Name arrives at a node, it can compare the number with numbers in its cache to find a node that is numerically closer to the desired node. In this way the resolve request is passed from node to node, getting closer to its target with each hop.

Peer Names are converted into 128-bit numbers called P2P ID's by using hashing functions described in the above incorporated applications. The same Peer Name will always produce the same P2P ID. A specific instance of a Peer Name registration also has a 128-bit number called a service location. The two together make a 256-bit number called the PNRP ID. The service location portion of the PNRP ID makes the specific instance of the Peer Name registration unique in the network.

An application may register a Peer Name with PNRP. A PNRP ID is created from the name, and messages are sent informing other nodes of the registration. The same Peer Name may be registered on more than one node. The P2P ID will be the same on each node, but the PNRP ID should be unique for each node. An application may ask to resolve a Peer Name to an address. A P2P ID is derived from the Peer Name, and messages are sent to other nodes to locate a node that has this P2P ID registered. When a P2P ID is resolved into an address, a certified peer address (CPA) is returned. This CPA includes the service location part of the target's PNRP ID, current IP addresses, public key, and many other fields. The CPA is signed to prevent tampering.

A given P2P ID may be registered by many different nodes. PNRP uses a 'service location' suffix to ensure each registered instance has a unique PNRP ID. A 'service location' is a 128-bit number corresponding to a unique network service endpoint. The value is created by combining the IPv6 address, port, protocol, and part of the public key. Service locations should be considered opaque by PNRP clients. A service location has two important properties. At any moment, a service location identifies a unique instance of a Peer name. When two service locations are compared, the length of the common prefix for each is a reasonable measure of network proximity. Two service locations which start with the same four bits are usually no further apart than two which start with the same three bits. These benefits may apply only for Global scope native unicast IPv6 addresses.

Creation and registration of PNRP ID's is only one part of the PNRP service. PNRP service execution can be divided into four phases. The first is PNRP cloud discovery. A new node must find an existing node in the cloud it wishes to join. The cloud may be the global PNRP cloud, a site local (enterprise) cloud, or a link local cloud. The second phase is the joining of a PNRP cloud. Once the new node has found an existing node, it performs the SYNCHRONIZE procedure to obtain a part of the existing nodes top cache level. A subset of a single cache level provides enough information for a new node to start participating in the cloud. The third phase contemplates active participation in the cloud. After initialization has completed, the node may participate in PNRP ID registration and resolution. During this phase, the peer also performs regular cache maintenance. The final phase relates to a peer leaving the cloud. The node un-registers any locally registered PNRP ID's, then terminates.

The PNRP protocol of the present invention, to effectuate the various functions of PNRP, comprises ten different types of messages. At a high level the messages include a RESOLVE message that is used to request resolution of a target PNRP ID into a CPA. A RESPONSE message is used as the result of a completed RESOLVE request. A FLOOD message contains a CPA intended for the PNRP cache of the recipient. A SOLICIT message is used to ask a PNRP node to ADVERTISE its top level cache. An ADVERTISE message contains a list of PNRP IDs for CPAs in a node's top level cache. A REQUEST message is used to ask a node to flood a subset of ADVERTISE'd CPAs. An INQUIRE message is used to ask a node whether a specific PNRP ID is registered at that node. An AUTHORITY message is used to confirm local registration of a PNRP ID, and optionally provide a certificate chain to help validate the CPA for that ID. An ACK message is used to acknowledge receipt and/or successful processing of certain messages. Finally, a REPAIR message is used to try to merge clouds that may be split.

A node may initiate six basic types of transactions in PNRP during which the messages of the present invention are utilized. These transactions include cloud discovery, synchronization, resolution, flooding, identity validation, and repairing. To provide a basic understanding of these transactions, the details of which are explained in the above identified applications, a brief description of these transactions as they relate to the messages and the message structures of the present invention.

The cloud discovery transaction allows a peer to discover a peer cloud. In a preferred embodiment, each node may join some number of clouds. The set of clouds that can be joined depends on the network connectivity that the node has. If a node computer has multiple interface adapters, then it may join multiple Link Local clouds. If a node is part of a site that supports IPv6, then it may have access to a Site Local cloud. If a node has connections to more than 1 such site (perhaps through VPN) then it may have access to multiple Site Local clouds. If a node is connected to the internet, it may have access to the Global cloud.

A node may choose to join or not join a cloud it has access to. When an application first requests to either Register a Peer Name on a cloud, or Resolve a Peer Name on a cloud, then the node must join the cloud if it has not already done so. To join the cloud it must try to locate at least one other node in the same cloud. If it cannot find another node, then it may assume that it is the first node in the cloud, and it will wait for other nodes to join later.

Each time a PNRP node joins a cloud, it must perform cloud discovery to find another node. Cloud discovery may also take place later if the PNRP implementation determines that its cache is not healthy, and it needs to obtain more cache entries. If the initial Cache discovery attempt does not work, then further attempts may be made later. Cloud discovery is performed using the following procedures. First, a peer can conduct discovery from persisted cache. In such a procedure, the peer first checks for persisted cache. If no cache has been persisted, then the peer must attempt discovery by supplied node address discussed below. If cache entries have been persisted, for all cache entries the peer calculates a priority by giving preference to CPAs which have not expired, and then to CPAs which have a long lifetime, and then to CPAS whose expiration time is most recent. The peer then attempts synchronization with the chosen nodes in sequence until one of them provides some cache entries.

As indicated above, if there is no persisted cache, the peer tries to perform discovery by supplied node address. In this procedure the peer checks if administrative configuration specifies a set of peers to which to connect. If not, then the peer tries multicast discovery discussed below. Otherwise, for each specified endpoint the peer attempts synchronization in sequence until one of them provides some cache entries.

For multicast discovery, if Simple Service Discovery Protocol (SSDP) is available, the peer issues an SSDP MSEARCH for a PNRP service instance in the desired cloud. The Search Target string to use in the SSDP Search message is "urn:Microsoft Windows Peer Name Resolution Protocol: <major>:<Protocol>:<Scope>" Where <major> is a number representing the version, Protocol is "IPV6", and Scope is one of "Global", SiteLocal", or "LinkLocal". The search may be issued in advance so that responses are available in time. If SSDP is not available, the peer can try these other discovery protocols. If there are none available, then the peer will have to try Directory Name Server (DNS) discovery described below. However, if responses are received, the responses are put into a list of nodes to be tried. If no responses are available within a short period of time, then the node may want to try other discovery protocols. The period of time may be determined by the implementation. The peer may attempt synchronization with the chosen nodes in sequence until one of them provides some cache entries.

For DNS discovery, the peer issues a DNS query for the well known name of a seed server. This name for the global cloud may be, e.g., SEED.PNRP.NET. If successful, the peer may conduct synchronization described below. If cloud discovery has not succeeded by this point, however, PNRP sets the cloud state to unable to discover other members of the cloud, and assumes it is the first node in the cloud. It may try later to synchronize again.

Synchronization allows a node to obtain a set of CPAs from another node's cache. Synchronization is performed after cloud discovery. It is performed with a single node randomly selected from a set of nodes returned by cloud discovery. Synchronization is secured to mitigate certain attacks. Synchronization may also be performed if the cache for a cloud becomes empty due to ageing, but this should happen only rarely. Before starting the Synchronization, the node must ensure that it has at least one locally registered CPA. If a Peer Name has not already been registered, then the node may generate a node ID for itself in the cloud. The synchronization process involves five types of the messages of the present invention, including SOLICIT, ADVERTISE, REQUEST, FLOOD, and ACK.

FIG. 3 illustrates a simple message exchange for synchronization. In this FIG. 3, suppose node A 212 is initiating synchronization with node B 214. In such a situation the message flow between the nodes would appear as illustrated in FIG. 3. Specifically, the SOLICIT message 216 requests a list of PNRP IDs from a node 214 that was chosen during cloud discovery. This SOLICIT message 216 is filled in as described in Table 1.

TABLE 1

| SOLICIT message fields | values |
|---|---|
| Nonce | Value of hashed Nonce |
| Source CPA | CPA for a locally registered Peer Name or generated node ID |

The node keeps track of the Nonce value used to create the hashed Nonce. Timers are associated with this state, as well as a retry count. If an ADVERTISE message 218 is not received in response to the sent SOLICIT 216, the SOLICIT 216 will be resent. If the retry count is exceeded, then the state is released and the transaction is terminated.

The node 214 that receives a SOLICIT 216 responds with an ADVERTISE message 218. The ADVERTISE 218 contains an array of PNRP IDs. The node 214 first applies throttling heuristics to determine if it is willing to engage in a synchronization transaction. If it is busy, it responds with an ADVERTISE message 218 with no PNRP IDs in the array. Otherwise it selects a well distributed set of PNRP IDs from its cache. This could be done by using the top level cache entries, or by random selection. If there are not enough entries in the cache, the node 214 should include its own locally registered IDs as well. The ADVERTISE message 218 includes the hashed Nonce from the SOLICIT message 216. The ADVERTISE 218 is considered to be an acknowledgement for the SOLICIT 216.

If the array of PNRP IDs was not empty, the node 214 also keeps state that an ADVERTISE 218 with the hashed Nonce value was sent. This state may be a bit in a bitmap. A timer is associated with this state, so if a matching message is not received within, e.g., 15 seconds, the transaction is aborted and the state is released. The node 214 may also add the Source CPA from the SOLICIT message 216 to its cache. The ADVERTISE message 218 is filled in as indicated in Table 2.

TABLE 2

| ADVERTISE message fields | values |
|---|---|
| Nonce | Value of hashed Nonce copied from SOLICIT |
| ID array | List of PNRP IDs |

When a node 212 receives the ADVERTISE 218, it first ensures that it had sent a corresponding SOLICIT 216. If not, it drops the message. The ADVERTISE 218 is treated as an acknowledgement for the SOLICIT 216. If the array of PNRP IDs in the ADVERTISE 218 is empty, the transaction is complete. Otherwise the node 212 goes through the array of PNRP IDs in the ADVERTISE 218 and selects the ones it wants to include in its cache. It sends a REQUEST message 220, including an array of the selected PNRP IDs. In the REQUEST message 220 it places the original Nonce value used to create the hashed Nonce for the SOLICIT message 216. The REQUEST message 220 is filled in as indicated in Table 3.

TABLE 3

| REQUEST message fields | values |
|---|---|
| Nonce | Value of Nonce used to create hashed Nonce in SOLICIT |
| ID array | List of PNRP IDs |

The REQUEST message 220 is sent to node B 214, which responds with an ACK 222 to indicate receipt and avoid retransmissions. If an ACK 222 is not received in a timely fashion, node A 212 will retransmit the REQUEST. If all retransmits are exhausted without receiving an ACK for the REQUEST, the transaction fails and is terminated.

If the transaction is successful, i.e. node 212 received the ACK 222 from node 214, the node 214 then verifies that the Nonce is valid. It does this by hashing the received Nonce, and checking if it matches the state saved above. If it does not match, no further processing takes place. If it is valid, then for each PNRP ID in the array that it still has in its cache, it sends a FLOOD message $224_1, 224_2, \ldots 224_N$. The FLOOD message 224 includes the CPA for the PNRP ID. It should be noted that the FLOOD messages 224 are not synchronous. That is, FLOOD(ID=1) $224_1$, does not need to be acknowledged before FLOOD(ID=2) 224 is sent. Upon receiving the FLOOD 224 by peer 212, normal processing of the FLOOD message 224 takes place. This includes sending an ACK 226 and verifying the validity of the CPA.

The soliciting node 212 may decide to repeat this procedure if the number of selected IDs is not large enough. In this case it should use a different node with which to synchronize so that it will get a different list of IDs.

The Resolution process is initiated by a node by sending a RESOLVE message. A RESOLVE may be initiated because an application is requesting to resolve a Peer name to an address, as part of Registering a PNRP ID, as part of cache maintenance, or to detect cloud splits. A RESOLVE message contains some flags and codes to tune the resolve processing, to set a limit on how many nodes to visit in attempting the resolve, and to guide the accuracy of the ID matching. It specifies the desired target PNRP ID. At each hop the ID of the next hop is inserted, as well as the best match CPA found so far. In addition, an array of visited node endpoints is included to track the path of the RESOLVE message from hop to hop. The originator of the RESOLVE adds itself as the first entry in the path. The resolution transaction resolves a PNRP ID into a Certified Peer Address. Only the CPA owner may authoritatively fulfill a resolution request for its CPA. Cached CPAs may only be used as hints for routing RESOLVE requests. They cannot be used to set the "best match" field of a RESOLVE or RESPONSE.

A RESOLVE message is terminated when the node hosting the target PNRP ID is reached, or when the number of nodes visited equals the Max Hops set in the RESOLVE, or when it is no longer possible for any node in the path to forward the RESOLVE to a better node. Upon termination, select contents from the RESOLVE are transferred into a new RESPONSE message, which is forwarded back toward the RESOLVE initiator. The RESPONSE contains the 'best match' CPA from the RESOLVE, as well as the list of visited nodes. Once the RESPONSE reaches the RESOLVE originator, the originator can easily verify whether they found the target CPA by comparing the 'best match' CPA's PNRP ID to target.

A three node example of a RESOLVE/RESPONSE transaction is illustrated in FIG. 4. In this simplified example, node A 228 is attempting to resolve for node T 232 via node B 230. There are 3 messages involved in the Resolve transaction besides the ACK, to wit RESOLVE, RESPONSE, and AUTHORITY. Once the resolution is complete, the node A 228 can send node T 232 an INQUIRE message directly as will be discussed below.

For the RESOLVE messages, there are three cases to consider, the first two of which are illustrated in FIG. 4. The three cases are initiating a RESOLVE 234 at node A 228, forwarding a RESOLVE 236 from node A 228 to another node B 230, and having a RESOLVE sent back from a node (not shown in FIG. 4). Each of these scenarios are discussed in turn.

Initiating a RESOLVE at node A 228 is discussed first. As illustrated in FIG. 4, node A 228 initiates a RESOLVE for some reason. These reasons include an application resolve request, registration advertisement, cache breadth maintenance, or cloud split detection. The initiator 228 also specifies an operation code, indicating if the RESOLVE may be satisfied by a locally registered ID. If it can be, then node A 228 scans the set of locally registered IDs for a match. If one is found, the RESOLVE is completed within node A 228 itself with the matching ID. If a locally registered ID is not acceptable, or if none of the local IDs are a match, then a RESOLVE message 234 is created with the fields shown in Table 4. This RESOLVE message 234 is then forwarded to some other node 230 for processing as described below.

TABLE 4

| | |
|---|---|
| Target ID | Set to desired ID |
| NextHop | PNRP ID selected from cache. |
| MaxHops | May be constant or relative to estimated cloud size |
| BestMatch | CPA for a locally registered Peer Name |
| Path | 1 entry, contains best source address and port |
| ReasonCode, OperationCode, Precision | Values depend on Resolve initiator |

When node A 228 wants or needs to forward a RESOLVE 234 to another node B 230, this next node must first be chosen. To choose the next hop, the node A 228 makes a list L of the three cached CPA's with PNRP IDs that are closest to the Target ID (node T 232), excluding any whose address is already listed in Path, and those which are not closer to the Target ID than A's closest locally registered ID. If the Target ID is in list L, that entry is chosen as the next hop. Otherwise, if the list L is not empty, then one entry is chosen at random. In other words, node A 228 finds some new nodes that are closer to the target than this node, and chooses one of them to which to forward the RESOLVE message 234.

If node A 228 is able to select a next hop, then node A 228 inserts an appropriate entry in the 'received bitmap'. Node A 228 adds itself to the Path, choosing its best address for the selected next hop, and marking the entry Accepted. The node A 228 sets NextHop to the selected destination's expected PNRP ID, and forwards the RESOLVE message 234 to node B 230. If the RESOLVE message 234 is successfully sent, then the sending node 228 expects to receive an acknowledgement in the form of an AUTHORITY message 238. If the AUTHORITY 238 is received, then the node 228 maintains a context for the RESOLVE 234, and waits up to a time out value for a RESPONSE 240 message to be returned. If the AUTHORITY 238 is not received after some time, the RESOLVE 234 is sent again. A total of N retires will occur before it is assumed that the NextHop is invalid. In a preferred embodiment, N=3. If the retry count is exceeded, then the NextHop CPA is removed from the local cache, and the entry is added to Path as a failed hop. If the hop count is not exceeded, then another NextHop is selected from the local cache, and the process is repeated. If the number of entries in Path equals or exceeds MaxHops, then a RESPONSE message is generated with a Response code of RESULT_MAX_HOP_LIMIT_HIT, and sent to the most recent entry in Path that was marked as Accepted.

If the node was not able to find a next hop, it checks if the Target ID should be in the lowest cache level. If it should be, then the node suspects that the Target ID may not exist. The node checks the existing Path entries and counts the ones that are marked as Suspicious. If this count exceeds a threshold, then a RESPONSE message is generated with a Response code of RESULT_TOO_MANY_MISSES, and is sent to the most recent entry in Path that was marked as Accepted. If the node was not able to find a next hop, but the Suspicious count is not exceeded, the node sends the RESOLVE back to the last node in Path that is marked as Accepted. The node first adds itself to the Path, choosing its best address for the destination node, and marking the entry Rejected. It sets NextHop to 0, and sets the RF_IGNORE_NEXTHOP flag to indicate backtracking. If the Target ID should be in the lowest cache level of the node, then it suspects that the Target ID may not exist. In this case the node also marks its Path entry as Suspicious. If the node was not able to find a next hop, and there are no nodes in the Path (besides itself), then it is the originator of the RESOLVE message. In this case it returns a result to the caller, indicating failure to resolve, with Response Code of RESULT_NO_BETTER_PATH_FOUND. The BestMatch CPA is made available to the caller.

Node B 230 receives a RESOLVE message 234 containing a target PNRP ID, a BestMatch CPA, a Next Hop PNRP ID, and a Path listing the address of all nodes which have processed the RESOLVE. If the flags field does not have RF_IGNORE_NEXTHOP set and the BestMatch CPA may have a CPA or it may be empty, node B 230 checks its local processing load. If the load is too high to process new RESOLVE requests, it responds with an AUTHORITY 238 with the flags field set to 'AF_REJECT_TOO_BUSY', and processing is complete. The AUTHORITY receiver is responsible for adding the rejecting node endpoint to the path array and re-routing the RESOLVE request elsewhere.

The receiving node 230 checks that the Path array contains at least 1 address marked as Accepted, and that the last such address is the same as the source of the message. If not, no further processing is done. The receiving node also checks the parameters in the received request. If some parameters are not in a valid range, then it responds with an AUTHORITY messages with the flags field set to 'AF_INVALID_REQUEST', and processing is complete. An example of an invalid parameter is if MaxHops is too large. The AUTHORITY receiver is responsible for adding the rejecting node endpoint to the path array and re-routing the RESOLVE request elsewhere.

The receiving node (node B 230 for example) checks if the NextHop ID is registered locally. A seed server may skip this test. If this fails, it responds with an AUTHORITY with the flags field set to "AF_UNKNOWN_ID", and processing is complete. The AUTHORITY receiver is responsible for re-routing the RESOLVE request elsewhere. The AUTHORITY receiver should also remove the AUTHORITY sender's PNRP ID from its cache when AF_UNKNOWN_ID is received. If the BestMatch CPA is included in the message, the node validates the BestMatch, as far as it is able. If the CPA is not valid, the node removes the BestMatch CPA from the message. If the BestMatch CPA is valid, then the node follows the usual rules for deciding whether to add the CPA to its cache.

The node also checks if there is already an entry for it in the Path. If there is, then there is a loop since this is not a back-tracked RESOLVE. The node then responds with an AUTHORITY with the flags field set to "AF_REJECT_LOOP", and processing is complete. The AUTHORITY receiver is responsible for adding the rejecting node endpoint to the Path array and re-routing the RESOLVE request elsewhere.

If all of the previous checks passed, the node B 230 sends an AUTHORITY 238 to acknowledge the RESOLVE message 234. If the RESOLVE flag RF_SEND_CHAIN was set, then the certificate chain for the NextHop is included in the AUTHORITY 238. The Classifier string portion of the Peer Name corresponding to the next hop PNRP ID is included in the AUTHORITY message.

Node B 230 checks whether it has a locally registered CPA that is a better match than the current BestMatch. If it does it replaces the BestMatch with this one. The node also checks whether it has a locally registered CPA that satisfies the RESOLVE criteria, based on the OpCode, Precision, and TargetID. If it has a match, or if the number of entries in the path >=MaxHops, then the node creates a RESPONSE message with the current BestMatch. The RESOLVE message's path is copied to the RESPONSE message's path. The node sets the ResponseCode to indicate either RESULT_FOUND_MATCH or RESULT_MAX_HOP_LIMIT_HIT. The node then removes its address from path as well as subsequent entries marked Rejected, and sends the RESPONSE to the most recent entry in path that is marked Accepted.

If the node B 230 did not send a RESPONSE (as illustrated FIG. 4), then it tries to forward the RESOLVE message 236 to the next node T 232. This forwarding follows the procedure described above. That is, node T 232 responds initially with an AUTHORITY message 242. It then performs the checks discussed above and, determining that it matches the Target, responds to node B 230 with a RESPONSE message 244 identifying itself as the BestMatch. In response to the RESPONSE message 244, node B 230 sends back an ACK message 246. Node B 230 then checks the path and forwards the RESPONSE message 240 to node A 228, which responds with an ACK message 248.

As indicated above, a node may also have to handle a backtracked RESOLVE. When a node receives a RESOLVE message R it contains a Target ID PNRP ID, a BestMatch CPA, a NextHop PNRP ID, and a Path listing the address of all nodes which have processed the RESOLVE. For a backtracked RESOLVE the flags field does have RF_IGNORE_NEXTHOP set. The node first checks its 'received bitmap' to verify that it has previously forwarded this RESOLVE. If the bit is not set, the message is dropped. The node then checks the Path to ensure that its address is on the Path and that it is the top most entry that's marked Accepted in the Path. Otherwise the message is dropped. If the message is not dropped, the node sends an AUTHORITY back to the sender to ACK the message. It does not include a certificate chain.

If the number of entries in the Path >=Max Hops, then the node creates a RESPONSE message S with the current BestMatch. The RESOLVE message R's Path is copied to S's Path. The node sets the Response Code to indicate Max Hops exceeded. The node then removes its address from Path and sends the RESPONSE back to the most recent entry in Path that is marked Accepted. If the node did not send a RESPONSE, then it tries to forward the RESOLVE to the next hop. This follows the procedure described above with some exceptions: a) "Node B 230 checks whether it has a locally registered CPA that is a better match than the current BestMatch. If it does it replaces the BestMatch with this one." DOES NOT APPLY; and b) if the current node is the originator of the RESOLVE transaction AND the reason is REASON_REPAIR_DETECTION, processing is complete.

As discussed briefly above, when a node receives a RESPONSE message 244, 240 it contains a TargetID PNRP ID, a BestMatch CPA, and a path listing the address of all nodes which have processed the RESOLVE. The receiving node also checks its 'received bitmap' to verify that it has previously sent a RESOLVE 234, 236 that matches this RESPONSE 240, 244. If the bit is not set, the message is dropped. The receiving node also checks the Path to ensure that its address is the last one (most recent) on the Path, and that it is marked as Accepted. Otherwise the message is dropped. If the message is not dropped this receiving node sends an ACK 246, 248 to acknowledge receipt. The node validates the BestMatch CPA as far as it is able, and adds it to its cache. Adding a CPA to a cache is subject to a set of rules that may require further messages being exchanged, so that P can validate the BestMatch CPA. This is described in the above identified applications.

Then node then removes itself from the Path. The node also removes the previous entries that are marked Rejected, until it encounters an entry marked Accepted or the list is depleted. If an entry marked as Accepted is found, then the node forwards the RESPONSE to this node. If the node having the RESPONSE forwarded to it does not reply with an ACK, the node retransmits the RESPONSE up to N times. If retransmits time out, then the node removes the failed destination node from the path, and retries the RESPONSE processing discussed in this paragraph. If there are no more entries in the Path, then the node is the originator of the original RESOLVE 234. The node 228 validates that it did originate the request. If it did not, the RESPONSE is dropped. If the Response Code indicates success, the node 228 then does an identity validation check on the source of the BestMatch CPA. This involves sending an INQUIRE message 250 to the target node 232, and verifying the returned AUTHORITY message 252. If the identity validation fails, it changes the response code to IDENTITY_FAILURE. It returns the results back to the caller.

An AUTHORITY message may be fragmented by the sender. It is up to the receiver to ensure it has received all the fragments before processing the AUTHORITY message. If any fragment is not received within a reasonable amount of time, then the original message (INQUIRE or RESOLVE) should be resent, unless the retry count is exceeded. If the AUTHORITY message flags has AF_CERT_CHAIN set, the node should perform a chain validation operation on the cached CPA for the PNRP ID specified in ValidateID. The chain should be checked to ensure all certificates in it are valid, and the relationship between the root and leaf of the chain is valid. The hash of the public key for the chain root should be compared to the authority in the CPA's Peer Name to ensure they match. The public key for the chain leaf should be compared against the key used to sign the CPA to ensure they match. Finally, the P2P ID should be checked to see that it is the hash of the Authority and Classifier according to the rules for creating the P2P ID. If any of the above checks fail, the CPA should be removed from the cache, and the RESOLVE message should be modified by adding the address of the node that sent the AUTHORITY message to the RESOLVE message Path and marking the entry Rejected.

If AF_UNKNOWN_ID is set, the CPA should be removed from the cache. If AF_CERT_CHAIN was not set, but the CPA corresponding to the ValidateID PNRP ID requires a cert chain to validate, the CPA should be removed from the cache, and the RESOLVE message should be modified by adding the address of the node that sent the AUTHORITY message to the RESOLVE message Path and marking the entry Rejected.

When the CPA corresponding to the ValidateID PNRP ID has been validated, it should be marked as fully validated. The Classifier string is extracted from the AUTHORITY message and kept with the CPA. If AF_REJECT_TOO_BUSY, AF_UNKNOWN_ID, AF_REJECT_LOOP, and AF_INVALID_REQUEST are all clear, the RESOLVE has been accepted for processing, and AUTHORITY processing is done.

In some cases a node that receives a RESOLVE message may choose not to accept it for forwarding, but still provide a Next Hop suggestion to the sending node. In this case the node returns a suggested Referral Endpoint and Referral PNRP ID in the AUTHORITY message. In this case the AUTHORITY Flags value should contain AF_REDIRECT. The node that receives an AUTHORITY with AF_REDIRECT may choose whether or not to use the Referral Endpoint to send the RESOLVE message. In either case the node that responded with the AUTHORITY is added to the Path. The only time that a node should use the Referral Endpoint is in the case where the node originating the RESOLVE was doing it to detect a cloud split, and had sent a RESOLVE to a PNRP Seed Server with a Reason of REASON_REPAIR. In other cases the node should ignore the Referral Endpoint.

PNRP uses directed flooding to propagate CPA cache entries between nodes. Flooding is used in several cases. During synchronization in response to a REQUEST message, the requested CPAs are flooded to the peer who sent the REQUEST. The REQUEST message is only accepted after a SOLICIT message has been accepted and an ADVERTISE message has been sent. Whenever a CPA is added to the cache's lowest level, the added CPA is flooded to the n peers closest to the locally register ID. The value of n may be tuned, and a value of 4 is preferred. If the reason for adding a CPA is due to receiving a FLOOD, then the CPA should not be flooded to nodes whose address is in the Flooded List of the received FLOOD. The addresses in the received Flooded List should be copied to the new FLOOD message Flooded List if there is enough room. Whenever a CPA is removed from the cache's lowest level upon receipt of a FLOOD containing a CPA revocation, the revoked CPA is flooded to the n closest peers to the locally register ID. Once again, the value of n may be tuned, but a value of 4 is preferred. The CPA should not be flooded to nodes whose address is in the Flooded List of the received FLOOD. The addresses in the received Flooded List should be copied to the new FLOOD message Flooded List if there is enough room. Finally, when a FLOOD is received for a new Peer, and the CPA is added to the cache's lowest level, a FLOOD message is then sent to the new Peer with the local node's ID. An exception is made if the source of the FLOOD is the new Peer.

PNRP does not create persistent neighbor relationships. In the loosest sense, every node represented by a CPA in the CPA cache may be considered a neighbor. However, CPAs are added and removed from the cache without necessarily notifying the CPA issuer. Having a peer's CPA in a node's cache does not ensure that that neighbor has that node's CPA in its cache. The relationship is asymmetric. However, the final FLOOD condition described above does try to create symmetry for IDs that are close to each other.

Every UDP FLOOD message is acknowledged by an ACK before any other action is taken on that FLOOD. The sender of a FLOOD maintains state for some time that a FLOOD was sent. If the ACK is received, the state is released. If an ACK is not received for a period of time, the FLOOD is resent and the timer is reset. The FLOOD is retried up to a given number of times, preferably 3. If no ACK is received after the last retry, then the state is released. In addition, if the destination of the FLOOD was in the cache of the sender, then the cache entry is removed to avoid trying to send messages to the unresponsive node in the future.

When a node receives a FLOOD message, it is processed by first acknowledging the FLOOD message by sending an ACK. The flags field is set to "KF_NACK" if Validate ID was present and is not locally registered. Next, the FLOOD message is validated. This includes doing local verification of the CPA signature and contents. If the CPA is validated, then it is determined if the CPA will be added to the cache. If the CPA is for a PNRP ID that is registered locally on the same node, then there is no need to add it to the cache. If the identity used to sign the CPA cannot be verified by the CPA alone, and the CPA would be added to one of the two lower levels of the cache view, then identity validation needs to be performed as will be discussed below. If the validation fails, the node drops the FLOOD message. If it succeeds, the node continues processing the FLOOD. If the CPA is already expired then the node drops the FLOOD. If the CPA is a revocation CPA, then the node removes the corresponding CPA from the cache if there is one. If one was found, the node forwards the revocation to other neighbors by sending FLOOD messages.

If the CPA is not a revocation CPA, then the node updates the cache. If a matching CPA is already in the cache, the node updates the cache entry with the new CPA data. If this is a new entry, then the node creates a new entry and tries to add it to the cache. The entry may not be added if another entry needs to be removed to make room for it, but the existing entries are preferred to the new entries due to higher trust levels or better proximity metrics. If the entry belongs to the lowest cache level, then it should be added. If the CPA belongs to the lowest cache level, then it should be forwarded to some neighbors, even if it failed to be added to the cache. If the FLOOD was received during synchronization, then forwarding of FLOOD messages is suppressed, as it is assumed that all discovered CPAs are already known by other nodes. If the FLOOD needs to be forwarded, then a set of n PNRP IDs that are closest to the locally registered ID are chosen. A FLOOD message is sent to each of these with the new CPA, and a Flooded List that includes the n neighbors, plus contents of the Flooded List received in the FLOOD message that was received.

Identity Validation is a threat mitigation device used to validate CPAs. It has two purposes. First, identity validation ensures that the PNRP node specified in a CPA has the PNRP ID from that CPA locally registered. Second, for secure PNRP IDs, identity validation ensures that the CPA was signed using a key with a cryptographically provable relationship to the authority in the PNRP ID. Details on how identity validation accomplishes these two goals can be found in the above identified pending applications.

An identity validation check happens at two different times. First, an identity validation occurs when adding a CPA to the lowest two cache levels. CPA validity in the lowest two cache levels is critical to PNRP's ability to resolve PNRP IDs. Performing identity validation before adding a CPA to either of these two levels mitigates several attacks. In this case the CPA will be held in a list for up to, e.g., 30 seconds, waiting for the AUTHORITY message. Second, identity validation occurs opportunistically during RESOLVE. PNRP caches have a high rate of turnover. Consequently, most cache entries are overwritten in the cache before they are ever used. PNRP does not validate most CPAs until they are actually used. When a CPA is used to route a RESOLVE path, PNRP piggybacks identity validation on top of the RESOLVE message. The RESOLVE contains a 'next hop' ID which is treated the same as the 'target ID' in an INQUIRE message. The RESOLVE is acknowledged with an AUTHORITY message, the same as is expected for an INQUIRE. If an opportunistic identity validation fails, the receiver of the RESOLVE is not who the sender believes they are. Consequently, the RESOLVE is routed elsewhere and the invalid CPA is removed from the cache.

To illustrate this validation, assume P is a node requesting an identity validation for PNRP ID 'T'. N is the node receiving the identity validation request. P generates either an INQUIRE message with target ID=T, or a RESOLVE message with next hop=T (and RF_IGNORE_NEXTHOP not set). N checks its list of PNRP ID's registered locally. If T is not in that list, N responds with an AUTHORITY message indicating ID T is not locally registered. If the received message was a RESOLVE, the RESOLVE is discarded, as P will take care of forwarding it elsewhere. When T is in the list of PNRP IDs at N, N constructs an AUTHORITY message and sets the target ID to T. If the RF_SEND_CHAIN flag was set, N retrieves the certificate chain (if any) relating the key used to sign the CPA to the authority for PNRP ID T. The certificate chain is inserted into the AUTHORITY message. The Classifier part of the Peer Name is also added to the AUTHORITY message.

N sends the AUTHORITY message to P. If the AUTHORITY message is longer than 1216 bytes, then the message is split into multiple fragments of 1216 bytes or less, and each fragment is sent. If T is an unsecured ID, or if the CPA was already validated (sent RESOLVE with RF_SEND_CHAIN clear), then processing is completed. P validates the relationship between the CPA signing key and the authority used to generate PNRP ID T. If validation fails, the CPA is discarded. If validation fails and the initiating message was a RESOLVE, P forwards the RESOLVE elsewhere.

As explained in the above identified applications and as discussed briefly above, it is possible that PNRP clouds may be split. This can happen in two ways. First, the clouds may have started out independently and need to be merged. Second, the clouds may have started out as one, but some fragment of the cloud became isolated from the rest of the cloud. To bridge any possible splits, it is assumed that clouds will have designated seed servers. These are the same servers used for bootstrapping via DNS. If there are multiple seed servers in a cloud, then the seed servers must communicate with each other periodically to ensure that they exchange IDs in their cache. This can be done using the Synchronization process. This will avoid the creation of islands.

Nodes in a cloud will periodically poll seed servers to test if the node has become isolated from the main cloud, and attempt to merge back if necessary. The frequency at which a node will test for a split is inversely proportional to its estimate of the cloud size. This is to keep tests for splits from occurring too frequently. A node that has recently joined a cloud should wait for a period of time for its cache to have been populated before assuming that it is able to estimate the cloud size.

To enable merging of clouds, the PNRP REPAIR message is used. REPAIR has a PNRP ID, the IP address of a node, and a Repair Level number. Cache levels are numbered with 0 being the top level (broadest number range), and each subsequent level (smaller range) being 1 higher. When a split is first detected, initialize a Repair Level value to 0. When a node decides that it should perform a test for a split code, the node will internally generate a REPAIR, using the address of a known Seed Server as the IP address, a PNRP ID that is registered locally, and a level of 0. It processes this REPAIR itself.

When a REPAIR is processed, the node does a test for a split. It first finds a locally registered ID that is closest to the ID in the REPAIR message. Then it sends a RESOLVE for this ID+1 to the IP address specified in the REPAIR message. This RESOLVE should have a Reason Code of Repairing. If this resolves to a known node, then there is no split. If it resolves to a new node, then suspect a split. If the new node discovered falls in the bottom cache level (highest number), then flooding is performed as usual. A Reason Code of Repairing is set in the FLOOD message. As well, if the node receiving the RESOLVE puts the source ID in its lowest cache level, then that node will flood entries to the source. All this flooding will result in exchanging of several IDs with the new cloud. All new nodes discovered via flooding are kept track in this way.

If the new node discovered is closer than previously known nodes, and there are cache entries at the received Repair Level, then the node sends the REPAIR message to entries in the cache at the Repair Level. For each REPAIR sent, the node selects one of the newly discovered node ID and IP address, and pass in Repair Level+1. If the new node discovered is further than previously known nodes, then the node sends a REPAIR to the new node, passing in some ID and address from the local cache, and the received Repair Level. Each node that receives a REPAIR message processes them in the same way.

As will now be apparent, the PNRP protocol consists of ten message types. Each message begins with a PNRP header, followed by fields specific to that message type. Overhead (such as the field description) is calculated separately in the 'length' column of each message field table. In the following description, a generic message data structure shared by all of these messages is described, followed by a detailed description of the message data structure for each of the ten messages included in the protocol of the present invention. Following this discussion, a description of each of the field data structures that are used to construct the messages of the present invention will be provided.

Figure 5:
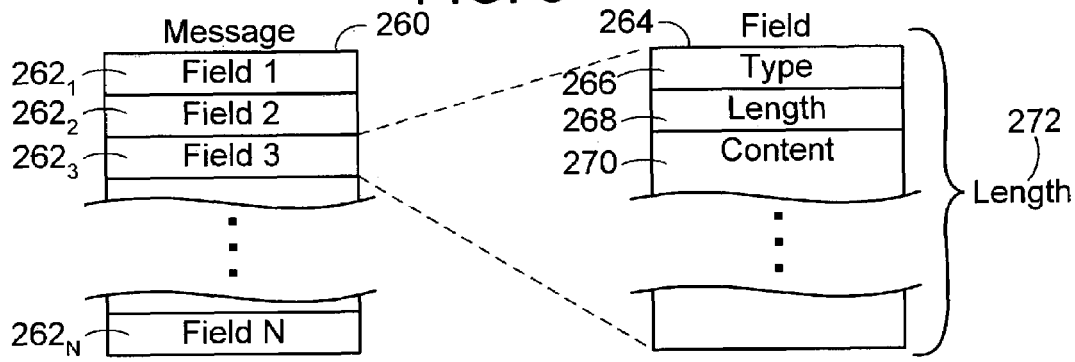
FIG. 5 is a data structure diagram illustrating the extensible data structure model of the present invention that allows for construction of the messages of the present invention.

Illustrated in FIG. 5 is an exemplary data structure diagram that illustrates the basic message data structure 260 used to construct the ten messages of the PNRP of the present invention. As may be seen, the message data structure 260 comprises a number of fields $262_{1-N}$. In a preferred embodiment, the first field $262_1$ is reserved for the PNRP Header. The field data structure 264 for each of the individual fields $262_{1-N}$ that are used to construct the message 260 includes a type component 266, a length component 268, and the actual content or payload 270 of the field data structure 264. The length component 268 is calculated as the length 272 of the entire field 264. In this way, the protocol is completely extensible.

Figure 6:
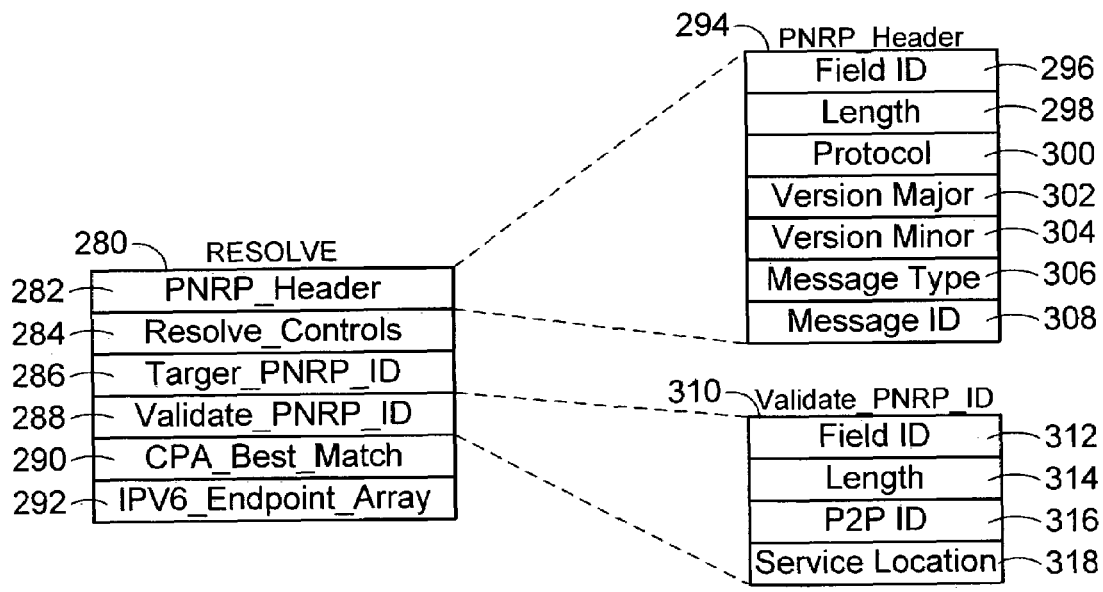
FIG. 6 is a simplified data structure diagram illustrating the construction of an exemplary message of the present invention.

In accordance with the data structure of the present invention, the RESOLVE message is constructed. As may be seen from the simplified data structure diagram of FIG. 6, the RESOLVE message 280 is constructed from a number of fields 282-292. Also in accordance with the field data structure of the present invention, the various fields are constructed. For example, the PNRP_HEADER field 282 comprises the field data structure 294. The components of this data structure 294 include the type (Field ID 296), the length 298. The content of this PNRP_HEADER data structure 294 includes a protocol component 300, a major version component 302, a minor version component 304, a message type component 306, and a message ID component 308. Similarly, the VALIDATE_PNRP_ID field 288 contains the filed data structure 310. As with all other field data structures, the VALIDATE_PNRP_ID data structure 310 begins with a type component (Field ID 312) and a length component 314. The content of this field data structure includes the P2P ID component 316 and the service location component 318. Each of the different fields are constructed in a similar fashion as illustrated in FIG. 5, descriptions of each will be provided below.

As may now be apparent and as will be illustrated below, this RESOLVE message contains a target PNRP ID to resolve, the CPA of the RESOLVE originator, the CPA of the 'best match', and a list of nodes which have processed the RESOLVE. The RESOLVE includes a 'flags' field. Two flags are defined for the Flags subfield of the Resolve_Controls field: RF_SEND_CHAIN—0x0001, which requests that the receiver send a certificate chain (if any exists) in AUTHORITY response; and RF_IGNORE_NEXTHOP—0x0004, which is used on the backtracking path of a RESOLVE. If a node is receiving a RESOLVE as part of backtracking, the sender does not know this node's PNRP ID. The 'next hop' field is set to zero, and RF_IGNORE_NEXTHOP is set to indicate the AUTHORITY will only be used as an 'ack' for the RESOLVE. As discussed above, RESOLVE receipt is acknowledged by an AUTHORITY message. The MessageType in the Header is set to 5 in a preferred embodiment of the present invention. Details of the data structure of the RESOLVE message constructed in accordance with the teachings of the present invention are presented in Table 5.

TABLE 5

| Offset | Length | Type | Name | Description |
|---|---|---|---|---|
| 0 | 4 + 8 | PNRP_HEADER | Header | Header |
| 12 | 4 + 12 | RESOLVE_CONTROLS | Controls | Flags, unique hops allowed for the RESOLVE request., opcode to control resolve, and precision for matches. Also reason for resolve. |
| 28 | 4 + 32 | TARGET_PNRP_ID | Target | PNRP ID to resolve |
| 64 | 4 + 32 | VALIDATE_PNRP_ID | NextHop | Expected next hop PNRP ID |
| 100 | 4 + P | CPA_BEST_MATCH | Best Match CPA | CPA for node with PNRP ID closest to Target so far. |
| 104 + P | 4 + 8 + A * 20 | IPV6_ENDPOINT_ARRAY | Flagged Path | Array of nodes which processed the RESOLVE. |
| 116 + P + A * 20 | | | | |

In this Table 5 P is the length in bytes of the encoded CPA, rounded up to the nearest DWORD boundary. A is the number of entries in the flagged array. This should not exceed the Max Hop value.

A RESPONSE is generated when a RESOLVE reaches the node owning the target PNRP ID, or when the flagged path size equals the RESOLVE Max Hops. When a RESPONSE is generated, all entries from the corresponding RESOLVE flagged path are copied into the RESPONSE path. RESPONSE messages are routed through all addresses marked 'accept' in Path, from bottom to top, until each appropriate network endpoint has processed the RESPONSE and it is returned to the RESOLVE originator. As discussed above, a RESPONSE receipt is acknowledged by an ACK message. In a preferred embodiment, the MessageType in the Header is set to 6. Details of the data structure of the RESPONSE message constructed in accordance with the teachings of the present invention are presented in Table 6.

TABLE 6

| Offset | Length | Type | Name | Description |
|---|---|---|---|---|
| 0 | 4 + 8 | PNRP_HEADER | Header | Header |
| 12 | 4 + 12 | RESOLVE_CONTROLS | Controls | Reason for original RESOLVE, and type of RESPONSE |
| 28 | 4 + 32 | TARGET_PNRP_ID | Target | PNRP ID resolve requested for |
| 64 | 4 + P | CPA_BEST_MATCH | Best Match CPA | CPA closest to Target |
| 68 + P | 4 + 8 + B * 20 | IPV6_ENDPOINT_ARRAY | Flagged Path | Array of nodes which processed the RESOLVE before the current node. |
| 80 + P + B * 20 | | | | |

In this Table 6, P is the length in bytes of the encoded source CPA, rounded up to the nearest DWORD boundary. B is the number of entries in the endpoint array.

The SOLICIT message requests the recipient to ADVERTISE some entries from its cache to the sender. The sender includes a CPA that the receiver may add to its cache. The HashedNonce must be returned in the ADVERTISE message. SOLICIT receipt is acknowledged by an ADVERTISE message. In a preferred embodiment, the MessageType in the Header is set to 1. Details of the data structure of the SOLICIT message constructed in accordance with the teachings of the present invention are presented in Table 7. In this table P is the length in bytes of the encoded source CPA, rounded up to the nearest DWORD boundary.

TABLE 7

| Offset | Length | Type | Name | Description |
|---|---|---|---|---|
| 0 | 4 + 8 | PNRP_HEADER | Header | Header |
| 12 | 4 + P | CPA_SOURCE | Source CPA | CPA for SOLICIT originator |
| 16 + P | 4 + 4 | HASHED_NONCE | Hashed Nonce | Hashed nonce |
| 24 + P | | | | |

The ADVERTISE Message is generated in response to a SOLICIT. The ADVERTISE lists some of the PNRP ID's from in the advertiser's cache. This allows the ADVERTISE recipient to selectively REQUEST CPA's to populate its cache. ADVERTISE receipt acts as an acknowledgement of a SOLICIT. No acknowledgement for the ADVERTISE is generated. Any ADVERTISE which is not acting as an acknowledgement of a SOLICIT should be silently discarded. The HashedNonce value must be identical to the one received in the SOLICIT message. A node that receives an ADVERTISE, must be able to validate that the Hashed Nonce is valid. In a preferred embodiment, the MessageType in the Header is set to 2. Details of the data structure of the ADVERTISE message constructed in accordance with the teachings of the present invention are presented in Table 8. In this table A is the # of entries in the ID array.

TABLE 8

| Offset | Length | Type | Name | Description |
|---|---|---|---|---|
| 0 | 4 + 8 | PNRP_HEADER | Header | Header |
| 12 | 4 + 4 | PNRP_HEADER_ACKED | ACKd Header | Header from SOLICIT being implicitly ACKd |
| 20 | 4 + 8 + A * 32 | PNRP_ID_ARRAY | ID Array | Sorted array of PNRP ID's available for REQUEST. |
| 32 + A * 32 | 4 + 4 | HASHED_NONCE | HashedNonce | Encrypted nonce value |
| 40 + A * 32 | | | | |

The REQUEST message is used to request an advertiser to FLOOD a subset of ADVERTISE'ed CPAs. The Nonce should be hashed and compared with the HashedNonce received in the original SOLICIT. The ID Array contains PNRP IDs that the sender would like to be Flooded back to the sender so that it can get the CPAs. REQUEST receipt is acknowledged by an ACK message. In a preferred embodiment of the present invention, the MessageType in the Header is set to 3. Details of the data structure of the REQUEST message constructed in accordance with the teachings of the present invention are presented in Table 9. In this table A is the # of entries in the ID array.

TABLE 9

| Offset | Length | Type | Name | Description |
|---|---|---|---|---|
| 0 | 4 + 8 | PNRP_HEADER | Header | Header |
| 12 | 4 + 4 | NONCE | Nonce | Decrypted nonce value |
| 20 | 4 + 8 + A * 32 | PNRP_ID_ARRAY | ID Array | Sorted array of PNRP ID's for requested CPAs |
| 32 + A * 32 | | | | |

The FLOOD message is used by PNRP to propagate cached CPAs to select peers. FLOODs are initiated in response to a REQUEST message, when adding a new CPA to the lowest cache level, or when processing a revoked CPA with an earlier version in the lowest cache level. FLOODs include a list of addresses to help prevent redundant FLOODs, called the 'flooded list'. The Flooded List contains the address of the sender, every destination the sender is going to directly transmit the FLOOD to, and the address of any other PNRP nodes the sender knows already received the FLOOD. A 'Flooded List' has a maximum number of entries. If the list becomes full, entries are replaced according in a FIFO manner. This assumes that FLOOD recipients are more likely to propagate that FLOOD to 'nearby' neighbors than more distant ones. FLOOD receipt is acknowledged by an ACK message. The Validate ID is an optional field. If present, it requests that the recipient respond with an ACK if a CPA with the specified PNRP ID is locally cached, else a NACK if it is not In a preferred embodiment, the MessageType in the Header is set to 4. Details of the data structure of the FLOOD message constructed in accordance with the teachings of the present invention are presented in Table 10. In this table P is the length in bytes of the encoded CPA, rounded up to the nearest DWORD boundary, and A is the number of entries in the array.

TABLE 10

| Offset | Length | Type | Name | Description |
|---|---|---|---|---|
| 0 | 4 + 8 | PNRP_HEADER | Header | Header |
| 12 | 4 + 2 + 2 | FLOOD_CONTROLS | Controls | Code that describes reason for FLOOD. May be used in processing FLOOD. Also, padding to move to 4-byte boundary |

TABLE 10-continued

| Offset | Length | Type | Name | Description |
|---|---|---|---|---|
| 20 | (4 + 32) | VALIDATE_PNRP_ID | Validate ID | Optional PNRP ID to verify |
| 20(+36) | 4 + P | CPA_BEST_MATCH | CPA | CPA being flooded |
| 24 + P(+36) | 4 + 8 + A * 20 | IPV6_ENDPOINT_ARRAY | Flooded List | |
| 36 + P + A * 20(+36) | | | | |

The INQUIRE message is used by PNRP nodes to perform identity validation on select CPA's before entering them into the local cache. An identity validation confirms a CPA is still valid at its originating node, and requests information to help validate authority of the originating node to register that CPA. One flag is defined for the 'flags' field: RF_SEND_CHAIN, which request for receiver to send a cert chain (if any exists) in AUTHORITY response. INQUIRE receipt is acknowledged with an AUTHORITY message if the PNRP ID is locally registered. Otherwise the INQUIRE message is silently ignored. In a preferred embodiment, the MessageType in the Header is set to 7. Details of the data structure of the INQUIRE message constructed in accordance with the teachings of the present invention are presented in Table 11. As will be apparent from this table, there are an additional 2 bytes after FLAGE_FIELD to put the next field on a DWORD boundary.

TABLE 11

| Offset | Length | Type | Name | Description |
|---|---|---|---|---|
| 0 | 4 + 8 | PNRP_HEADER | Header | Header |
| 12 | 4 + 2 + 2 | FLAGS_FIELD | Flags | Indicate whether cert chain or simple confirmation of local registration is desired. Also, padding to move to 4-byte boundary |
| 20 | 4 + 32 | VALIDATE_PNRP_ID | Validate PNRP ID | PNRP ID to validate presence of |
| 56 | | | | |

The AUTHORITY message is used to confirm or deny that a PNRP ID is still registered at the local node, and optionally provides a certificate chain to allow the AUTHORITY recipient to validate the node's right to register the CPA corresponding to the target ID. The following flags are defined for the 'flags' field: AF_UNKNOWN_ID-0x0001, which indicates that the specified 'validate' PNRP ID is not registered at this host; AF_INVALID_SOURCE—0x0002, which is not used; AF_INVALID_BEST_MATCH-0x0004, which is also not used; AF_REJECT_TOO_BUSY—0x0008, which is only valid in response to a RESOLVE and indicates that the host is too busy to accept a RESOLVE, and the sender should forward it elsewhere for processing; AF_REJECT_DEAD-END—0x0010, which is not used; AF_REJECT_LOOP—0x0020, which indicates that the node has already processed the RESOLVE message and that it should not have been sent here; AF_TRACING_ON—0x0040, which is used for debugging only; AF_REDIRECT—0x0080, which indicates that the node is not forwarding the RESOLVE message, but has included a Referral address in the AUTHORITY message; AF_INVALID_REQUEST—0x0100, which indicates that the RESOLVE message fails validation which could happen if the MaxHops is too large; and AF_CERT_CHAIN—0x8000, which indicates that a certificate chain is included enabling validation of the relationship between the Validate PNRP ID and the public key used to sign its CPA.

The Validate PNRP ID has the ID for which the AUTHORITY is sent. The Cert Chain is optional. The AF_CERT_CHAIN flag indicates if it is present or not. The Referral Endpoint is also optional. This field is used by a node that cannot forward a RESOLVE message, but knows of another node to which the RESOLVE could be sent. The endpoint contains an IPv6 address and port of a peer node to which the RESOLVE is to be sent. Currently this field is ignored except when a node is trying to detect a cloud split via a seed server. The Classifier field contain the actual Classifier string that is part of the Peer Name used to create the PNRP ID. AUTHORITY receipt is not explicitly acknowledged. AUTHORITY is only sent as an acknowledgement/response to either INQUIRE or RESOLVE messages. If an AUTHORITY is ever received out of this context, it must be discarded. In a preferred embodiment, the MessageType in the Header is set to 8. Details of the data structure of the AUTHORITY message constructed in accordance with the teachings of the present invention are presented in Table 12. In this table C is the length in bytes of the encoded cert chain, rounded up to the nearest DWORD boundary, and S is the length in bytes of the Classifier string.

TABLE 12

| Offset | Length | Type | Name | Description |
|---|---|---|---|---|
| 0 | 4 + 8 | PNRP_HEADER | Header | Header |
| 12 | 4 + 4 | PNRP_HEADER_ACKED | ACKd Header | Header from RESOLVE or INQUIRE being implicitly ACKd |
| 20 | 4 + 4 | SPLIT_CONTROLS | SplitControl | Optional Split control for fragmentation |

TABLE 12-continued

| Offset | Length | Type | Name | Description |
|---|---|---|---|---|
| 20(+8) | 4 + 2 + 2 | FLAGS_FIELD | Flags | Flags indicating contents and possibly result of RESOLVE/INQUIRE. Also, padding to move to 4-byte boundary |
| 28(+8) | 4 + 32 | VALIDATE_PNRP_ID | Validate | PNRP ID AUTHORITY pertains to |
| 64(+8) | (4 + 20) | IPV6_REFERRAL_ADDRESS | Referral Endpoint | IPv6 endpoint. This field is optional. |
| 64(+32) | (4 + 32) | IPV6_REFERRAL_ID | Referral PNRP ID | PNRP ID for the IPv6 endpoint. This field is optional. |
| 64(+68) | 4 + C | CERT_CHAIN | Cert Chain | Cert chain relating public key used to sign CPA to the registered ID |
| 68 + C (+68) | (4 + 8 + S) | CL:ASSIFIER | Classifier | Classifier string. This field is optional. |
| 68 + C (+S + 80) | | | | |

The AUTHORITY message may be very long, as it contains a Certificate Chain and a Classifier string. To facilitate transmission through a network, it may be explicitly broken into several fragments when it is sent. The Receiver must be able to put the fragments together before processing the message. If the message is split, then the Header and Ack'd Header fields are repeated in each fragment. Each fragment also contains a Split Control field. In each fragment the Offset value in the Split Controls field are changed to reflect the Offset of the fragment. The Size value in Split Controls is the size of the entire message, minus the Header, ACK'd Header and Split Control field sizes. Each fragment except the last, must have the same size. If the message is not split, then the Split Controls field is optional.

The ACK message is used by PNRP as it is a request/response protocol. In certain circumstances, using an ACK instead of a response simplifies the protocol. An ACK is always transmitted upon receipt of REQUEST, RESPONSE and FLOOD messages. Other messages are acknowledged by the appropriate response message type. The ACK may act as an ACK, or in the case of a FLOOD with a Validate ID set, as a NACK by setting the Flags field to KF_NACK=1. In a preferred embodiment the MessageType in the Header is set to 9. Details of the data structure of the ACK message constructed in accordance with the teachings of the present invention are presented in Table 13.

TABLE 13

| Offset | Length | Type | Name | Description |
|---|---|---|---|---|
| 0 | 4 + 8 | PNRP_HEADER | Header | Header |
| 12 | 4 + 4 | PNRP_HEADER_ACKED | ACKd Header | Header from ACKd message |
| 20 | (4 + 2 + 2) | FLAGS_FIELD | Flags | Optional flags field. also, padding to move to 4-byte boundary. |
| 20(+8) | | | | |

The REPAIR message is used because, in some cases, PNRP clouds may experience a split. This message is used to test for a split and initiate a REPAIR if necessary. A REPAIR will request other nodes to propagate the REPAIR to other cache levels. In a preferred embodiment the MessageType in the Header is set to 10. Details of the data structure of the REPAIR message constructed in accordance with the teachings of the present invention are presented in Table 14. As will be apparent from this table, there are an additional 2 bytes after CACHE_LEVEL to put the next field on a DWORD boundary.

TABLE 14

| Offset | Length | Type | Name | Description |
|---|---|---|---|---|
| 0 | 4 + 8 | PNRP_HEADER | Header | Header |
| 12 | 4 + 32 | TARGET_PNRP_ID | PNRP ID | ID to locate |
| 48 | 4 + 2 + 2 | CACHE_LEVEL | Repair Level | Cache level to use for repair test. Also, padding to move to 4-byte boundary. |
| 56 | 4 + 20 | IPV6_ENDPOINT | Repair Address | IP endpoint to use for repair test |
| 80 | | | | |

Having discussed the messages and their data structures, attention is now turned to the message elements used to construct these messages. The following details the byte codes of structures transmitted in PNRP messages. All numbers are transmitted in network byte order, and all text is encoded as UTF-8 before transmission, unless otherwise indicated. These message elements are the building blocks for the messages just discussed. The basic message element is a Field description. Each Field element should start on a 4 byte boundary within a message. This means that there may gaps between Fields.

The MESSAGE_FIELD element is the field description that is used to ensure PNRP will be easily extensible in the future. For each set of data in a message, it provides a 16-bit 'field ID' identifying the field type, and a 16-bit byte count for the field. Details of the data structure of the MESSAGE_FIELD element constructed in accordance with the teachings of the present invention are presented in Table 15.

TABLE 15

| Offset | Length | Type | Name | Description |
| --- | --- | --- | --- | --- |
| 0 | 2 | USHORT | Field ID | |
| 2 | 2 | USHORT | Length | Field length in bytes, including MESSAGE_FIELD |
| 4 | | | | |

The PNRP_HEADER—type 0x0010 is used to start all PRNP messages. Protocol+Version make a 4-byte identifier useful for determining whether a received message is truly intended for PNRP. Details of the data structure of the PNRP_HEADER element constructed in accordance with the teachings of the present invention are presented in Table 16.

TABLE 16

| Offset | Length | Type | Name | Description |
| --- | --- | --- | --- | --- |
| 0 | 1 | BYTE | Protocol | A 8-bit number identifying the PNRP protocol. Value = 0x51 |
| 1 | 1 | BYTE | Version Major | Major protocol version, e.g. '1' for v. 1.2 |
| 2 | 1 | BYTE | Version Minor | Minor protocol version, e.g. '2' for v. 1.2 |
| 3 | 1 | BYTE | MessageType | Messages 1-10 are defined in this spec |
| 4 | 2 | ULONG | Message ID | Number to help with ACK tracking. May be random. Recommended to be monotonically increasing ordinal. |
| 8 | | | | |

The Message ID in the PNRP_HEADER is used so that a node can ensure that a received message that purports to be in response to a message that the node sent, is in fact such a response. For example, suppose that a node sends a RESOLVE message to another node. The first node expect to receive an AUTHORITY message in return, as illustrated in FIG. 4. However, without any way tracking or tracing the response to the original RESOLVE, there is no guarantee that a received AUTHORITY message is legitimate or spoofed by a malicious node in the cloud. By including a Message ID in the RESOLVE message, the node that generates the AUTHORITY message can include this Message ID in its response in the PNRP_HEADER_ACKED field discussed below.

The PNRP_HEADER_ACKED—type 0x0018 is an entire PNRP message header, used to identify a message being ACK'd. Details of the data structure of the PNRP_HEADER_ACKED element constructed in accordance with the teachings of the present invention are presented in Table 17.

TABLE 17

| Offset | Length | Type | Name | Description |
| --- | --- | --- | --- | --- |
| 0 | 4 | ULONG | Acked Message ID | ID of message being ACKed. |
| 4 | | | | |

The IPV6_ENDPOINT—type 0x0021 element is used because PNRP is specified to work in IPv6 clouds. This structure specifies an IPv6 network endpoint. There is also a flag that may be used to indicate node utility for a RESOLVE in progress. The Path Flag is used to indicate if a RESOLVE sent to the Address was Accepted or Rejected. In addition if the Address was to a close neighbor, the Suspect flag may be set, since the node should know all its close neighbors. The AddressRemoved indicator is used during debugging to mark an entry as removed, without actually removing it. These indicators are as follows:

PNRP_FLAGGED_ADDRESS_ACCEPTED—0x01;
PNRP_FLAGGED_ADDRESS_REJECTED—0x02;
PNRP_FLAGGED_ADDRESS_UNREACHABLE—0x04;
PNRP_FLAGGED_ADDRESS_LOOP—0x08;
PNRP_FLAGGED_ADDRESS_TOO_BUSY—0x10;
PNRP_FLAGGED_ADDRESS_BAD_VALIDATE_ID—0x20;
PNRP_FLAGGED_ADDRESS_REMOVED—0x80; and
PNRP_FLAGGED_SUSPECT_UNREGISTERED_ID—0x40. Details of the data structure of the IPV6_ENDPOINT element constructed in accordance with the teachings of the present invention are presented in Table 18.

TABLE 18

| Offset | Length | Type | Name | Description |
| --- | --- | --- | --- | --- |
| 0 | 1 | BYTE | PathFlag | Flags for this node endpoint |
| 1 | 1 | BYTE | Protocol | IP Protocol number, should be set to UDP |
| 2 | 2 | USHORT | Port | IPv6 Port |
| 4 | 16 | BYTE[16] | Address | IPv6 Address |
| 20 | | | | |

The PNRP_ID—type 0x0030 element is a concatenation of a 128-bit p2p ID and a 128-bit service location. Details of the data structure of the PNRP_ID element constructed in accordance with the teachings of the present invention are presented in Table 19.

TABLE 19

| Offset | Length | Type | Name | Description |
| --- | --- | --- | --- | --- |
| 0 | 16 | BYTE[16] | p2p ID | 16-byte (128-bit) hash of Peer name |
| 16 | 16 | BYTE[16] | Service Location | 16-byte (128-bit) service location (derived from advertised service address) |
| 32 | | | | |

The TARGET_PNRP_ID—type 0x0038 is the target ID for a RESOLVE request or its corresponding RESPONSE. Details of the data structure of the TARGET_PNRP_ID element constructed in accordance with the teachings of the present invention are presented in Table 20.

TABLE 20

| Offset | Length | Type | Name | Description |
| --- | --- | --- | --- | --- |
| 0 | 16 | BYTE[16] | p2p ID | 16-byte (128-bit) hash of Peer name |
| 16 | 16 | BYTE[16] | Service Location | 16-byte (128-bit) service location (derived from advertised service address) |
| 32 | | | | |

The VALIDATE_PNRP_ID—type 0x0039 is the PNRP ID for which validation and an authority are requested. Details of the data structure of the VALIDATE_PNRP_ID element constructed in accordance with the teachings of the present invention are presented in Table 21.

TABLE 21

| Offset | Length | Type | Name | Description |
|---|---|---|---|---|
| 0 | 16 | BYTE[16] | p2p ID | 16-byte (128-bit) hash of Peer name |
| 16 | 16 | BYTE[16] | Service Location | 16-byte (128-bit) service location (derived from advertised service address) |
| 32 | | | | |

The FLAGS_FIELD—type 0x0040 identify flags that are a bit field used for context-specific purposes. Details of the data structure of the FLAGS_FIELD element constructed in accordance with the teachings of the present invention are presented in Table 22.

TABLE 22

| Offset | Length | Type | Name | Description |
|---|---|---|---|---|
| 0 | 2 | USHORT | Flags | Bit field for context-specific flags |
| 2 | | | | |

The RESOLVE_CONTROLS—type 0x0041 field contains information to be used in processing a RESOLVE or a RESPONSE. Flags are used to indicate if the RESOLVE is backtracking or if an AUTHORITY message is requested. The flags include RF_IGNORE_NEXT_HOP—0x0001; RF_SEND_CHAIN—0x0004; RF_DONT_REMOVE_PATH_ENTRIES—0x0008, which is used for debug only; and RF_TRACING_ON—0x0010, which is used for debug only. Max Hops limits the number of hops before completing the RESOLVE. Operation Code describes how the matching should be performed. Matches may be only the top 128 bits (P2P ID) for ANY codes, or may consider the Service Location as well for NEAREST codes. Operation codes also determine if the match should consider IDs registered on the same node as the originator of the RESOLVE. The operation codes include: SEARCH_OPCODE_NONE-0; SEARCH_OPCODE_ANY_PEERNAME-1; SEARCH_OPCODE_NEAREST_PEERNAME-2; SEARCH_OPCODE_NEAREST64_PEERNAME-4; and SEARCH_OPCODE_UPPER_BITS-8. Precision sets the precision on the ID matching to an actual number of bits. This value is used if the operation code is SEARCH_OPCODE_UPPER_BITS.

Reason is used to indicate if the RESOLVE was sent as part of a Repair process, due to cache maintenance, as part of a Register, or due to an application request. The Reasons include: REASON_APP_REQUEST—0; REASON_REGISTRATION-1; REASON_CACHE_MAINTENANCE—2; REASON_REPAIR_DETECTION-3; REASON_SYNC_REQUEST—4; REASON_CPA_VIA_RESOLVE-5; REASON_CPA_VIA_FLOOD—6; REASON_REPAIR-7; and REASON_CPA_VIA_BACK_FLOOD-8.

The Result Code indicates why the RESOLVE was completed and converted to a RESPONSE. This may indicate success or failure due to Hop count exceeded, no better path found, or too many neighbors failed to locate the target. These Results Codes include: RESULT_NONE-0; RESULT_FOUND_MATCH-1; RESULT_MAX_HOP_LIMIT_HIT-2; RESULT_NO_BETTER_PATH_FOUND-3; and RESULT_TOO_MANY_MISSES-4. The transaction ID is used by the originator of a request to correlate the RESPONSE. The RESOLVE originator sets the Trans ID value, and the node that initiates the RESPONSE echoes the value in the RESPONSE message. Intermediate nodes should not alter this value. Details of the data structure of the RESOLVE_CONTROLS element constructed in accordance with the teachings of the present invention are presented in Table 23.

TABLE 23

| Offset | Length | Type | Name | Description |
|---|---|---|---|---|
| 0 | 2 | USHORT | Flags | Bit field for context-specific flags |
| 2 | 1 | BYTE | Max Hops | Number of PNRP nodes a message can visit |
| 3 | 1 | BYTE | Operation Code | Codes to control resolve operation. Should RESOLVE be sent to originator? Should upper 128 bits of ID be treated as special? |
| 4 | 2 | USHORT | Precision | Number of significant bits to match. |
| 6 | 1 | BYTE | Reason Code | Code that describes reason for initiating RESOLVE - application request, repair detection, registration, cache maintenance, etc. |
| 7 | 1 | BYTE | Result Code | Code that describes reason for returning the Response - found match, Max hop limit hit, no better path found, etc. |
| 8 | 4 | ULONG | Trans ID | Transaction ID value. |
| 12 | | | | |

The CACHE_LEVEL—type 0x0042 element describes which cache level is to be used when executing a REPAIR. This is used when doing a split cache repair. Details of the data structure of the CACHE_LEVEL element constructed in accordance with the teachings of the present invention are presented in Table 24.

TABLE 24

| Offset | Length | Type | Name | Description |
|---|---|---|---|---|
| 0 | 2 | USHORT | Cache Level | Cache level number (0 is top of cache). |
| 1 | | | | |

The FLOOD_CONTROLS—type 0x0043 element contains information to be used in processing a FLOOD. The Reason that the FLOOD was sent is the only code used. Details of the data structure of the FLOOD_CONTROLS element constructed in accordance with the teachings of the present invention are presented in Table 25.

TABLE 25

| Offset | Length | Type | Name | Description |
|---|---|---|---|---|
| 0 | 2 | USHORT | Flags | Bit field for context-specific flags |
| 2 | 1 | BYTE | Reason Code | Code that describes reason for initiating FLOOD - Synchronization request, discovered CPA via RESOLVE, discovered CPA via FLOOD, Doing Repair, etc. |
| 3 | | | | |

The CPA_SOURCE—type 0x0058 is the CPA used as the source CPA in a SOLICIT message. The CPA is encoded for network transmission. Details of the data structure of the CPA_SOURCE element constructed in accordance with the teachings of the present invention are presented in Table 26.

TABLE 26

| Offset | Length | Type | Name | Description |
| --- | --- | --- | --- | --- |
| 0 | P | CPA | Encoded CPA | Encoded CPA. |
| P | | | | |

The CPA_BEST_MATCH—type 0x0059 element is the CPA used as the 'best match' in a RESOLVE or RESPONSE. The CPA is encoded for network transmission. Details of the data structure of the CPA_BEST_MATCH element constructed in accordance with the teachings of the present invention are presented in Table 27.

TABLE 27

| Offset | Length | Type | Name | Description |
| --- | --- | --- | --- | --- |
| 0 | P | CPA | Encoded CPA | Encoded CPA. |
| P | | | | |

The PNRP_ID_ARRAY—type 0x0060 element includes the PNRP ID's for ADVERTISE and REQUEST messages stored in an array. The data, including the array sizes is described below. Details of the data structure of the PNRP_ID_ARRAY element constructed in accordance with the teachings of the present invention are presented in Table 28.

TABLE 28

| Offset | Length | Type | Name | Description |
| --- | --- | --- | --- | --- |
| 0 | 2 | USHORT | Num Entries | Number of entries in the ID array. Should be set to A |
| 2 | 2 | USHORT | Array Length | Total length of the array in bytes, including header. Should be 12 + (A * 32) |
| 4 | 2 | USHORT | Element Field Type | Identifier for the type of each array entry. Should be 0x0030, PNRP_ID |
| 6 | 2 | USHORT | Entry Length | Length of each array element in bytes. Should be 32 |
| 8 | A * 32 | PNRP_ID | ID List | Array of PNRP ID's |
| 8 + A * 32 | | | | |

The IPV6_ENDPOINT_ARRAY—type 0x0071 is an array of all nodes already visited. Flooded messages visit a variety of nodes. Each node already visited or transmitted to is entered into this array. The data including the array sizes is described below. Details of the data structure of the IPV6_ENDPOINT_ARRAY element constructed in accordance with the teachings of the present invention are presented in Table 29.

TABLE 29

| Offset | Length | Type | Name | Description |
| --- | --- | --- | --- | --- |
| 0 | 2 | USHORT | Num Entries | Number of entries in the address arrray. Should be set to A |
| 2 | 2 | USHORT | Array Length | Total length of the array in bytes, including header. Should be 12 + (A * 20) |
| 4 | 2 | USHORT | Element Field Type | Identifier for the type of each array entry. Should be 0x0021, IPV6_ADDRESS |
| 6 | 2 | USHORT | Entry Length | Length of each array element in bytes. Should be 19 |
| 8 | A * 20 | IPV6_ENDPOINT[ ] | Endpoint Array | Array of endpoints |
| 8 + A * 20 | | | | |

The IPV6_REFERRAL_ADDRESS—type 0x0072 element is an IPv6 Endpoint used specifically to provide an alternate address for sending a RESOLVE. This field is used in an AUTHORITY message when a node does not want to forward a RESOLVE, but wants to provide an address that some other node may try. Details of the data structure of the IPV6_REFERRAL_ADDRESS element constructed in accordance with the teachings of the present invention are presented in Table 30.

TABLE 30

| Offset | Length | Type | Name | Description |
| --- | --- | --- | --- | --- |
| 0 | 1 | BYTE | PathFlag | Flags for this node endpoint |
| 1 | 1 | BYTE | Protocol | IP Protocol number, should be set to UDP |
| 2 | 2 | USHORT | Port | IPv6 Port |
| 4 | 16 | BYTE[16] | Address | IPv6 Address |
| 20 | | | | |

The IPV6_REFERRAL_ID—type 0x0073 element is used together with IPv6_Referral_Address to indicate the PNRP ID that is being used for the referral. Details of the data structure of the IPV6_REFERRAL_ID element constructed in accordance with the teachings of the present invention are presented in Table 31.

TABLE 31

| Offset | Length | Type | Name | Description |
| --- | --- | --- | --- | --- |
| 0 | 16 | BYTE[16] | p2p ID | 16-byte (128-bit) hash of Peer name |
| 16 | 16 | BYTE[16] | Service Location | 16-byte (128-bit) service location (derived from advertised service address) |
| 32 | | | | |

The Cert Chain (CERT_CHAIN)—type 0x0080 element is built by using the Windows CAPI API. First the certificates that make up the chain are put into a CAPI in-memory cert store, and then exported as a PKCS7 encoded cert store. This exported store is sent without modification.

The WCHAR—type 0x0084 element is defined to hold a single UNICODE character. It is only used as part of UNICODE array field, such as Classifier.

The CLASSIFIER—type 0x0085 element is the UNICODE Classifier string that was used as a basis for the Peer Name. It is encoded as an array of WCHAR elements. Details of the data structure of the CLASSIFIER element constructed in accordance with the teachings of the present invention are presented in Table 32.

TABLE 32

| Offset | Length | Type | Name | Description |
|---|---|---|---|---|
| 0 | 2 | USHORT | Num Entries | Number of entries in the address array. Should be set to A |
| 2 | 2 | USHORT | Array Length | Total length of the array in bytes, including header. Should be 12 + (A * 2) |
| 4 | 2 | USHORT | Element Field Type | Identifier for the type of each array entry. Should be 0x0084, WCHAR |
| 6 | 2 | USHORT | Entry Length | Length of each array element in bytes. Should be 2 |
| 8 | A * 2 | WCHAR[] | Wide Character Array | Array UNICODE characters |
| 8 + A * 2 | | | | |

The HASHED_NONCE—type 0x0092 element is an encrypted Nonce value that is included in an ADVERTISE message. The recipient is expected to have the key to decrypt the Nonce. Details of the data structure of the HASHED_NONCE element constructed in accordance with the teachings of the present invention are presented in Table 33.

TABLE 33

| Offset | Length | Type | Name | Description |
|---|---|---|---|---|
| 0 | 4 | ULONG | Encrypted Nonce | Nonce value after encryption. |
| 4 | | | | |

The NONCE—type 0x0093 element is a decrypted Nonce value that is included in a REQUEST message. The recipient is expected to validate that the decrypted Nonce matches the value sent before it was encrypted. Details of the data structure of the NONCE element constructed in accordance with the teachings of the present invention are presented in Table 34.

TABLE 34

| Offset | Length | Type | Name | Description |
|---|---|---|---|---|
| 0 | 4 | ULONG | Decrypted Nonce | Nonce value. |
| 4 | | | | |

The SPLIT_CONTROLS—type 0x0098 element is used when a long message is sent as a series of fragments, rather than as a single message. Each fragment includes the Split Controls field so that the message can be constructed by the receiver. Details of the data structure of the SPLIT_CONTROLS element constructed in accordance with the teachings of the present invention are presented in Table 35.

TABLE 35

| Offset | Length | Type | Name | Description |
|---|---|---|---|---|
| 0 | 2 | USHORT | Size | Size of fragment |
| 2 | 2 | USHORT | Offset | Offset of fragment |
| 4 | | | | |

The PNRP_TRACE—type 0x0099 element is used during debugging to hold data that can be carried from hop to hop between RESOLVE and RESPONSE messages. It is used to store tracing data. May not be supported in final version of protocol.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for generating and sending a peer to peer protocol message for use in a peer to peer name resolution protocol (PNRP), the method comprising:
generating an extensible data structure including a first field comprising a PNRP header comprising a PNRP message type and at least one additional field corresponding to the PNRP message type, the PNRP message type comprising one of a RESOLVE, RESPONSE, SOLICIT, ADVERTISE, REQUEST, FLOOD, INQUIRE, AUTHORITY or REPAIR message;
populating the extensible data structure corresponding to a PNRP function; and
sending the peer to peer protocol message incorporating the populated extensible data structure.

2. The method of claim 1, wherein the first field further comprises a header identification, a header length, a protocol identifier, a version major identifier, a version minor identifier, and a message identification indicator.

3. The method of claim 1, wherein if the PNRP function comprises requesting resolution of a target PNRP identification into a certified peer address (CPA), populating the extensible data structure comprises:
populating the PNRP message type with a RESOLVE message,
populating a first additional field with a resolve controls message element,
populating a second additional field with a PNRP target identification message element,
populating a third additional field with a validate PNRP identification message element,
populating a fourth additional field with a certified peer address (CPA) best match message element, and
populating a fifth additional field with an IPV6 endpoint array message element.

4. The method of claim 3, wherein the resolve controls message element comprises a bit field for context-specific flags, a maximum number of nodes that the RESOLVE message can visit, one or more operation codes to control a resolve operation, a precision number of significant bits to match, a reason code that describes a reason for initiating the RESOLVE message, a result code that describes a reason for returning a response, and a transaction identification value.

5. The method of claim 3, wherein the target PNRP identification message element comprises a hash of a peer name of a target peer and a service location derived from an advertised service address.

6. The method of claim 3, wherein the validate PNRP identification message element comprises a hash of a peer name of a node for which validation and an authority are requested and a service location derived from an advertised service address of the node for which validation and an authority are requested.

7. The method of claim 3, wherein the CPA best match message element comprises an encoded CPA.

8. The method of claim 3, wherein the IPV6 endpoint array message element comprises a number of entries in an array, a total length of the array, an identifier for a type of each array entry, a length of each array element, and an array of addresses for each node already visited or to which the RESOLVE message was transmitted.

9. The method of claim 1, wherein if the PNRP function comprises responding to completion of a RESOLVE request, populating the extensible data structure comprises:
   populating the PNRP message type with a RESPONSE message, populating a first additional field with a resolve controls message element,
   populating a second additional field with a target PNRP identification (ID) message element,
   populating a third additional field with a CPA best match message element, and
   populating a fourth additional field with an IPV6 endpoint array message element.

10. The method of claim 9, wherein the resolve controls message element comprises a bit field for context-specific flags, a maximum number of nodes that the RESOLVE request can visit, one or more operation codes to control a resolve operation, a precision number of significant bits to match, a reason code that describes a reason for initiating the RESOLVE request, a result code that describes a reason for returning a response, and a transaction identification value.

11. The method of claim 9, wherein the target PNRP identification message element comprises a hash of a peer name of a target peer and a service location derived from an advertised service address.

12. The method of claim 9, wherein the CPA best match message element comprises an encoded CPA.

13. The method of claim 9, wherein the IPV6 endpoint array message element comprises a number of entries in an array, a total length of the array, an identifier for a type of each array entry, a length of each array element, and an array of addresses for each node already visited or to which the RESPONSE message was transmitted.

14. The method of claim 1, wherein if the PNRP function comprises asking a PNRP node to advertise one or more entries from its cache, populating the extensible data structure comprises:
   populating the PNRP message type with a SOLICIT message,
   populating a first additional field with a certified peer address source message element, and
   populating a second additional field with a hashed nonce message element.

15. The method of claim 14, wherein the CPA source message element comprises an encoded source CPA.

16. The method of claim 14, wherein the hashed nonce message element comprises an encrypted nonce value.

17. The method of claim 1, wherein if the PNRP function comprises generating a list of PNRP identifications from a PNRP node's cache, populating the extensible data structure comprises:
   populating the PNRP message type with an ADVERTISE message,
   populating a first additional field with a PNRP header acknowledged message element,
   populating a second additional field with a PNRP identification (ID) array message element, and
   populating a third additional field with a hashed nonce message element.

18. The method of claim 17, wherein the PNRP header acknowledged message element comprises a message identification of a received message that is being acknowledged.

19. The method of claim 17, wherein the PNRP ID array message element comprises a number of entries in a PNRP ID array, a total length of the array, an identifier for a type of each array entry, a length of each array element, and an array of PNRP IDs.

20. The method of claim 17, wherein the hashed nonce message element comprises an encrypted nonce value.

21. The method of claim 1, wherein if the PNRP function comprises requesting a PNRP node to flood a set of advertised certified peer addresses (CPAs), populating the extensible data structure comprises:
   populating the PNRP message type with a REQUEST message,
   populating a first additional field with a nonce message element, and
   populating a second additional field with a PNRP identification (ID) array message element.

22. The method of claim 21, wherein the nonce message element comprises a decrypted nonce value.

23. The method of claim 21, wherein the PNRP ID array message element comprises a number of entries in a PNRP ID array, a total length of the array, an identifier for a type of each array entry, a length of each array element, and an array of PNRP IDs.

24. The method of claim 1, wherein if the PNRP function comprises propagating a certified peer address (CPA) to select PNRP peers, populating the extensible data structure comprises:
   populating the PNRP message with a FLOOD message,
   populating a first additional field with a flood controls message element,
   populating a second additional field with a CPA best match message element, and
   populating a third additional field with an IPV6 endpoint array message element.

25. The method of claim 24, wherein the flood controls message element comprises a bit field for context-specific flags, and a reason code that describes the reason for initiation of the FLOOD message.

26. The method of claim 24, wherein the CPA best match message element comprises an encoded CPA.

27. The method of claim 24, wherein the IPV6 endpoint array message element comprises a number of entries in an array, a total length of the array, an identifier for a type of each array entry, a length of each array element, and an array of addresses for each node to which the FLOOD message is transmitted and for each node already known to have received the FLOOD message.

28. The method of claim 1, wherein if the PNRP function comprises requesting whether a specific PNRP identification is registered at a PNRP node, populating the extensible data structure comprises:
   populating the PNRP message type with an INQUIRE message,
   populating a first additional field with a flags field message element, and
   populating a second additional field with a validate PNRP identification message element.

29. The method of claim 28, wherein the flags field message element comprises a bit field for context-specific flags.

30. The method of claim 28, wherein the validate PNRP identification message element comprises a hash of a peer name of a node for which validation and an authority are requested and a service location derived from an advertised service address of the node for which validation and an authority are requested.

31. The method of claim 1, wherein if the PNRP function comprises confirming a local registration of a PNRP identification, populating the extensible data structure comprises:
  populating the PNRP message type with an AUTHORITY message,
  populating a first additional field with a PNRP header acknowledged message element,
  populating a second additional field with a split controls message element,
  populating a third additional field with a flags field message element,
  populating a fourth additional field with a validate PNRP identification (ID) message element,
  populating a fifth additional field with a certificate chain message element,
  populating a sixth additional field with an IPV6 referral address message element,
  populating a seventh additional field with an IPV6 referral identification message element, and
  populating an eighth additional field with a classifier message element.

32. The method of claim 31, wherein the PNRP header acknowledged message element comprises a message identification of a received message that is being acknowledged.

33. The method of claim 31, wherein the split controls message element comprises information of a size of fragmentation and an offset of the fragmentation.

34. The method of claim 31, wherein the flags field message element comprises a bit field for context-specific flags.

35. The method of claim 31, wherein the validate PNRP identification message element comprises a hash of a peer name of a node for which validation and an authority are requested and a service location derived from an advertised service address of the node for which validation and an authority are requested.

36. The method of claim 31, wherein the certificate chain message element comprises a PKCS7 encoded certificate store.

37. The method of claim 31, wherein the IPV6 referral address message element comprises a path flag for a node endpoint, an IP protocol number, an IPV6 port, and an IPV6 address as an alternate node's address.

38. The method of claim 31, wherein the IPV6 referral identification message element comprises a hash of a peer name and a service location for a node to which a referral is being made.

39. method of claim 31, wherein the classifier message element comprises a Unicode classifier string that was used as a basis for a peer name, encoded as an array of WCHAR elements including a number of entries in an address array, a total length of the array, an identifier for a type or each array entry, a length of each array element, and an array of Unicode characters.

40. The method of claim 1, wherein if the PNRP function comprises determining if clouds have been split and need repair, populating the extensible data structure comprises:
  populating the PNRP message type with a REPAIR message,
  populating a first additional field with a target PNRP identification message element,
  populating a second additional field with a cache level message element, and
  populating a third additional field with an IPV6 endpoint message element.

41. The method of claim 40, wherein the target PNRP identification message element comprises a hash of a peer name of a target peer and a service location derived from an advertised service address.

42. The method of claim 40, wherein the cache level message element comprises a cache level number identifying which cache level is to be used when executing a repair.

43. The method of claim 40, wherein the header message element further includes information identifying a particular message to allow tracking of responses to the particular message.

44. The method of claim 1, wherein the at least one additional field comprises a field identification field, a length field, and a payload.

45. A computer storage media tangibly embodying a program of instruction executable by a computer for performing the steps for generating and sending a peer to peer protocol message comprising a RESOLVE message comprising a request for resolution of a target PNRP identification into a certified peer address (CPA), the steps comprising:
  generating a RESOLVE message data structure for use in a peer to peer name resolution protocol (PNRP), comprising:
  generating a first message field having a PNRP header message element;
  generating a second message field having a resolve controls message element;
  generating a third message field containing a PNRP target identification message element;
  generating a fourth message field containing a validate PNRP identification message element;
  generating a fifth message field containing a certified peer address (CPA) best match message element;
  generating a sixth message field containing an IPV6 endpoint array message element; and
  sending the peer to peer protocol message incorporating the RESOLVE message data structure.

46. The computer storage media of claim 45, wherein each message element comprises a message element data structure comprising a field identification field, a length field, and a payload.

47. The computer storage media of claim 46, wherein the payload of the resolve controls message element comprises a bit field for context-specific flags, a maximum number of nodes that the RESOLVE message can visit, one or more operation codes to control a resolve operation, a precision number of significant bits to match, a reason code that describes a reason for initiating the RESOLVE message, a result code that describes a reason for returning a response, and a transaction identification value.

48. The computer storage media of claim 46, wherein the payload of the target PNRP identification message element comprises a hash of a peer name of a target peer and a service location derived from an advertised service address.

49. The computer storage media of claim 46, wherein the payload of the validate PNRP identification message element comprises a hash of a peer name of a node for which validation and an authority are requested and a service location derived from an advertised service address of the node for which validation and an authority are requested.

50. The computer storage media of claim 46, wherein the payload of the IPV6 endpoint array message element comprises a number of entries in an array, a total length of the array, an identifier for a type of each array entry, a length of each array element, and an array of addresses for each node already visited or to which the RESOLVE message was transmitted.

51. The computer storage media of claim 46, wherein the CPA best match message element comprises an encoded CPA.

52. A computer storage media tangibly embodying a program of instruction executable by a computer for performing the steps for generating and sending a peer to peer protocol message comprising a RESPONSE message comprising a response to completion of a RESOLVE request, the steps comprising:
  generating a RESPONSE message data structure for use in a peer to peer name resolution protocol (PNRP), comprising:
  generating a first message field having a PNRP header message element;
  generating a second message field having a resolve controls message element;
  generating a third message field containing a target PNRP identification ID message element;
  generating a fourth message field containing a certified peer address (CPA) best match message element; and
  generating a fifth message field containing an IPV6 endpoint array message element; and
  sending the peer to peer protocol message incorporating the RESPONSE message data structure.

53. The computer storage media of claim 52, wherein each message element comprises a message element data structure comprising a field identification field, a length field, and a payload.

54. The computer storage media of claim 53, wherein the payload of the resolve controls message element comprises a bit field for context-specific flags, a maximum number of nodes that the RESOLVE request can visit, one or more operation codes to control a resolve operation, a precision number of significant bits to match, a reason code that describes a reason for initiating the RESOLVE request, a result code that describes a reason for returning a response, and a transaction identification value.

55. The computer storage media of claim 53, wherein the payload of the target PNRP identification message element comprises a hash of a peer name of a target peer and a service location derived from an advertised service address.

56. The computer storage media of claim 53, wherein the payload of the CPA best match message element comprises an encoded CPA.

57. The computer storage media of claim 53, wherein the payload of the IPV6 endpoint array message element comprises a number of entries in an array, a total length of the array, an identifier for a type of each array entry, a length of each array element, and an array of addresses for each node already visited or to which the RESPONSE message was transmitted.

58. A computer storage media tangibly embodying a program of instruction executable by a computer for performing the steps for generating and sending a peer to peer protocol message comprising a SOLICIT message comprising a request for a PNRP node to advertise one or more entries from its cache, the steps comprising:
  generating a SOLICIT message data structure for use in a peer to peer name resolution protocol (PNRP), comprising:
  generating a first message field having a PNRP header message element;
  generating a second message field having a certified peer address (CPA) source message element; and
  generating a third message field containing a hashed nonce message element; and sending the peer to peer protocol message incorporating the SOLICIT message data structure.

59. The computer storage media of claim 58, wherein each message element comprises a message element data structure comprising a field identification field, a length field, and a payload.

60. The computer storage media of claim 59, wherein the payload of the CPA source message element comprises an encoded source CPA.

61. The computer storage media of claim 59, wherein the payload of the hashed nonce message element comprises an encrypted nonce value.

62. A computer storage media tangibly embodying a program of instruction executable by a computer for performing the steps for generating and sending a peer to peer protocol message comprising an ADVERTISE message comprising a list of PNRP identifications from a PNRP node's cache, the steps comprising:
  generating an ADVERTISE message data structure for use in a peer to peer name resolution protocol (PNRP), comprising:
  generating a first message field having a PNRP header message element;
  generating a second message field having a PNRP header acknowledged message element;
  generating a third message field containing a PNRP identification (ID) array message element; and
  generating a fourth message field containing a hashed nonce message element; and
  sending the peer to peer protocol message incorporating the ADVERTISE message data structure.

63. The computer storage media of claim 62, wherein each message element comprises a message element data structure comprising a field identification field, a length field, and a payload.

64. The computer storage media of claim 63, wherein the payload of the PNRP header acknowledged message element comprises a message identification of a message that is being acknowledged.

65. The computer storage media of claim 63, wherein the payload of the PNRP ID array message element comprises a number of entries in a PNRP ID array, a total length of the array, an identifier for a type of each array entry, a length of each array element, and an array of PNRP IDs.

66. The computer storage media of claim 63, wherein the payload of the hashed nonce message element comprises an encrypted nonce value.

67. A computer storage media tangibly embodying a program of instruction executable by a computer for performing the steps for generating and sending a peer to peer protocol message comprising a REQUEST message comprising a request for a PNRP node to flood a set of advertised certified peer addresses (CPAs), the steps comprising:
  generating a REQUEST message data structure for use in a peer to peer name resolution protocol (PNRP), comprising:
  generating a first message field having a PNRP header message element;
  generating a second message field having a nonce message element; and generating a third message field containing a PNRP identification (ID) array message element; and sending the peer to peer protocol message incorporating the REQUEST message data structure.

68. The computer storage media of claim 67, wherein each message element comprises a message element data structure comprising a field identification field, a length field, and a payload.

69. The computer storage media of claim 68, wherein the payload of the none message element comprises a decrypted nonce value.

70. The computer storage media of claim 68, wherein the payload of the PNRP ID array message element comprises a number of entries in a PNRP ID array, a total length of the array, an identifier for a type of each array entry, a length of each array element, and an array of PNRP IDs.

71. A computer storage media tangibly embodying a program of instruction executable by a computer for performing the steps for generating and sending a peer to peer protocol message comprising a FLOOD message comprising a propagation of a certified peer address (CPA) to select PNRP peers, the steps comprising:

generating a FLOOD message data structure for use in a peer to peer name resolution protocol (PNRP), comprising:

generating a first message field having a PNRP header message element;

generating a second message field having a flood controls message element;

generating a third message field containing a CPA best match message element; and generating a fourth message field containing an IPV6 endpoint array message element; and sending the peer to peer protocol message incorporating the FLOOD message data structure.

72. The computer storage media of claim 71, wherein each message element comprises a message element data structure comprising a field identification field, a length field, and a payload.

73. The computer storage media of claim 72, wherein the payload of the flood controls message element comprises a bit field for context-specific flags, and a reason code that describes the reason for initiation of the FLOOD message.

74. The computer storage media of claim 72, wherein the payload of the CPA best match message element comprises an encoded CPA.

75. The computer storage media of claim 72, wherein the payload of the IPV6 endpoint array message element comprises a number of entries in an array, a total length of the array, an identifier for a type of each array entry, a length of each array element, and an array of addresses for each node to which the FLOOD message is transmitted and for each node already known to have received the FLOOD message.

76. A computer storage media tangibly embodying a program of instruction executable by a computer for performing the steps for generating and sending a peer to peer protocol message comprising an INQUIRE message comprising a request to determine if a PNRP identification is registered at a PNRP node, the steps comprising:

generating an INQUIRE message data structure for use in a peer to peer name resolution protocol (PNRP), comprising:

generating a first message field having a PNRP header message element;

generating a second message field having a flags field message element; and generating a third message field containing a validate PNRP identification message element; and sending the peer to peer protocol message incorporating the INQUIRE message data structure.

77. The computer storage media of claim 76, wherein each message element comprises a message element data structure comprising a field identification field, a length field, and a payload.

78. The computer storage media of claim 77, wherein the payload of the flags field message element comprises a bit field for context-specific flags.

79. The computer storage media of claim 77, wherein the payload of the validate PNRP identification message element comprises a hash of a peer name of a node for which validation and an authority are requested and a service location derived from an advertised service address of the node for which validation and an authority are requested.

80. A computer storage media tangibly embodying a program of instruction executable by a computer for performing the steps for generating and sending a peer to peer protocol message comprising an AUTHORITY message comprising a confirmation of a registration of a PNRP identification, the steps comprising:

Generating an AUTHORITY message data structure for use in a peer to peer name resolution protocol (PNRP), comprising:

generating a first message field having a PNRP header message element;

generating a second message field having a PNRP header acknowledged message element;

generating a third message field containing a split controls message element;

generating a fourth message field containing a flags field message element;

generating a fifth message field containing a validate PNRP identification (ID) message element;

generating a sixth message field containing a certificate chain message element;

generating a seventh message field containing an IPV6 referral address message element;

generating an eighth message field containing an IPV6 referral identification message element; and generating a ninth message field containing a classifier message element; and sending the peer to peer protocol message incorporating the AUTHORITY message data structure.

81. The computer storage media of claim 80, wherein each message element comprises a message element data structure comprising a field identification field, a length field, and a payload.

82. The computer storage media of claim 81, wherein the payload of the PNRP header acknowledged message element comprises a message identification of a message that is being acknowledged.

83. The computer storage media of claim 81, wherein the payload of the split controls message element comprises information of a size of fragmentation and an offset of the fragmentation.

84. The computer storage media of claim 81, wherein the payload of the flags field message element comprises a bit field for context-specific flags.

85. The computer storage media of claim 81, wherein the payload of the validate PNRP identification message element comprises a hash of a peer name of a node for which validation and an authority are requested and a service location derived from an advertised service address of the node for which validation and an authority are requested.

86. The computer storage media of claim 81, wherein the payload of the certificate chain message element comprises a PKCS7 encoded certificate store.

87. The computer storage media of claim 81, wherein the payload of the IPV6 referral address message element comprises a path flag for a node endpoint, an IP protocol number, an IPV6 port, and an IPV6 address as an alternate node's address.

88. The computer storage media of claim 81, wherein the payload of the IPV6 referral identification message element comprises a hash of a peer name and a service location for a node to which a referral is being made.

89. The computer storage media of claim 81, wherein the payload of the classifier message element comprises a Unicode classifier string that was used as a basis for a peer name, encoded as an array of WCHAR elements including a number of entries in an address array, a total length of the array, an identifier for a type or each array entry, a length of each array element, and an array of Unicode characters.

90. A computer storage media tangibly embodying a program of instruction executable by a computer for performing the steps for generating and sending a peer to peer protocol message comprising a REPAIR message comprising a request to determine if clouds have split and need repair, the steps comprising:
   generating a REPAIR message data structure for use in a peer to peer name resolution protocol (PNRP), comprising:
   generating a first message field containing a PNRP header message element;
   generating a second message field containing a target PNRP identification message element;
   generating a third message field containing a cache level message element; and
   generating a fourth message field containing an IPV6 endpoint message element; and sending the peer to peer protocol message incorporating the REPAIR message data structure.

91. The computer storage media of claim 90, wherein each message element comprises a message element data structure comprising a field identification field, a length field, and a payload.

92. The computer storage media of claim 91, wherein the payload of the target PNRP identification message element comprises a hash of a peer name of a target peer and a service location derived from an advertised service address.

93. The computer storage media of claim 91, wherein the payload of the cache level message element comprises a cache level number identifying which cache level is to be used when executing a repair.

94. A method of providing identification of peer nodes to a first node in a peer-to-peer network, comprising the steps of:
   receiving at a second node a SOLICIT message from the first node requesting PNRP IDs, wherein the SOLICIT message includes at least a header message element and a hashed nonce element;
   generating at the second node an ADVERTISE message, wherein the ADVERTISE message includes at least a header acknowledged message element, the hashed nonce message element, and a PNRP ID array message element, and wherein the PNRP ID array message element includes a distributed selection from a list of PNRP IDs in a cache of the second node; and
   sending the ADVERTISE message to the first node.

\* \* \* \* \*